US005517196A

United States Patent [19]
Pakett et al.

[11] Patent Number: 5,517,196
[45] Date of Patent: May 14, 1996

[54] SMART BLIND SPOT SENSOR WITH OBJECT RANGING

[76] Inventors: Allan G. Pakett, 3947 Tambor Rd., San Diego, Calif. 92124; Jimmie R. Asbury, 1627 Guy St., #3, San Diego, Calif. 92192

[21] Appl. No.: 267,424

[22] Filed: Jun. 28, 1994

Related U.S. Application Data

[63] Continuation-in-part of Ser. No. 111,826, Aug. 25, 1993, Pat. No. 5,325,096, which is a continuation of Ser. No. 930,079, Aug. 14, 1992, abandoned.

[51] Int. Cl.⁶ .............................. G01S 13/60; G01S 13/93
[52] U.S. Cl. ................................... 342/70; 342/71
[58] Field of Search ............................. 342/70, 71, 72, 342/27, 28

[56] References Cited

U.S. PATENT DOCUMENTS

| | | | |
|---|---|---|---|
| 3,394,342 | 7/1968 | Walker | 342/70 |
| 3,689,882 | 9/1972 | Dessailly . | |
| 3,697,985 | 10/1972 | Faris et al. | 342/70 |
| 3,745,572 | 7/1973 | Sato et al. | 342/70 |
| 3,750,169 | 7/1973 | Strenglein . | |
| 3,760,415 | 9/1973 | Holmstrom et al. . | |
| 3,778,826 | 12/1973 | Flannery et al. . | |
| 3,859,660 | 1/1975 | Augustine et al. . | |
| 3,898,652 | 8/1975 | Rashid | 342/70 |
| 3,978,481 | 8/1976 | Angwin et al. . | |
| 4,072,945 | 2/1978 | Katsumata et al. . | |
| 4,349,823 | 9/1982 | Tagami et al. | 342/70 |
| 4,845,506 | 7/1989 | Shibata et al. . | |
| 4,920,520 | 4/1990 | Göbel et al. . | |
| 5,008,678 | 4/1991 | Herman | 342/158 |
| 5,087,918 | 2/1992 | May et al. | 342/85 |
| 5,115,245 | 5/1992 | Wen et al. . | |
| 5,181,038 | 1/1993 | Asbury et al. . | |
| 5,302,956 | 4/1994 | Asbury et al. | 342/70 |
| 5,325,096 | 6/1994 | Pakett | 342/70 |
| 5,325,097 | 6/1994 | Zhang et al. | 342/71 |
| 5,339,075 | 8/1994 | Abst et al. | 340/903 |
| 5,400,032 | 3/1995 | Asbury et al. | 342/70 |

*Primary Examiner*—John B. Sotomayor
*Attorney, Agent, or Firm*—Baker, Maxham, Jester & Meador

[57] ABSTRACT

A radar system for sensing the presence of obstacles in a vehicle's "blind spots" and generating a signal to the vehicle operator indicative of the presence of such an obstacle. The system uses a common radar transceiver that transmits a multi-frequency radio signal directed at a blind spot of the vehicle. The signal is reflected off any obstacles that are present in that blind spot region. Doppler shifts in the received reflected multi-frequency signal generally indicates that an obstacle has moved into the blind spot. Doppler frequencies attributable to objects which are of no interest, such as stationary objects, are filtered out. The system has a signal processor which determines if a potentially hazardous object is within a pre-determined range from the vehicle. Only objects that are traveling at approximately the same speed and direction as the vehicle, and that are within a pre-determined range of the vehicle, are considered to be of interest, and will cause the blind spot sensor to generate an indication that an obstacle is present within the blind spot. The indication is preferably an unobtrusive illuminated indicator which is affixed to one of the vehicle's mirrors. In addition to the illuminated indicator affixed to a mirror, an obtrusive audible indicator is provided in the preferred embodiment of the present invention which creates an audible tone, whistle, or buzz when an obstacle is present and the vehicle's turn signal is active.

30 Claims, 12 Drawing Sheets

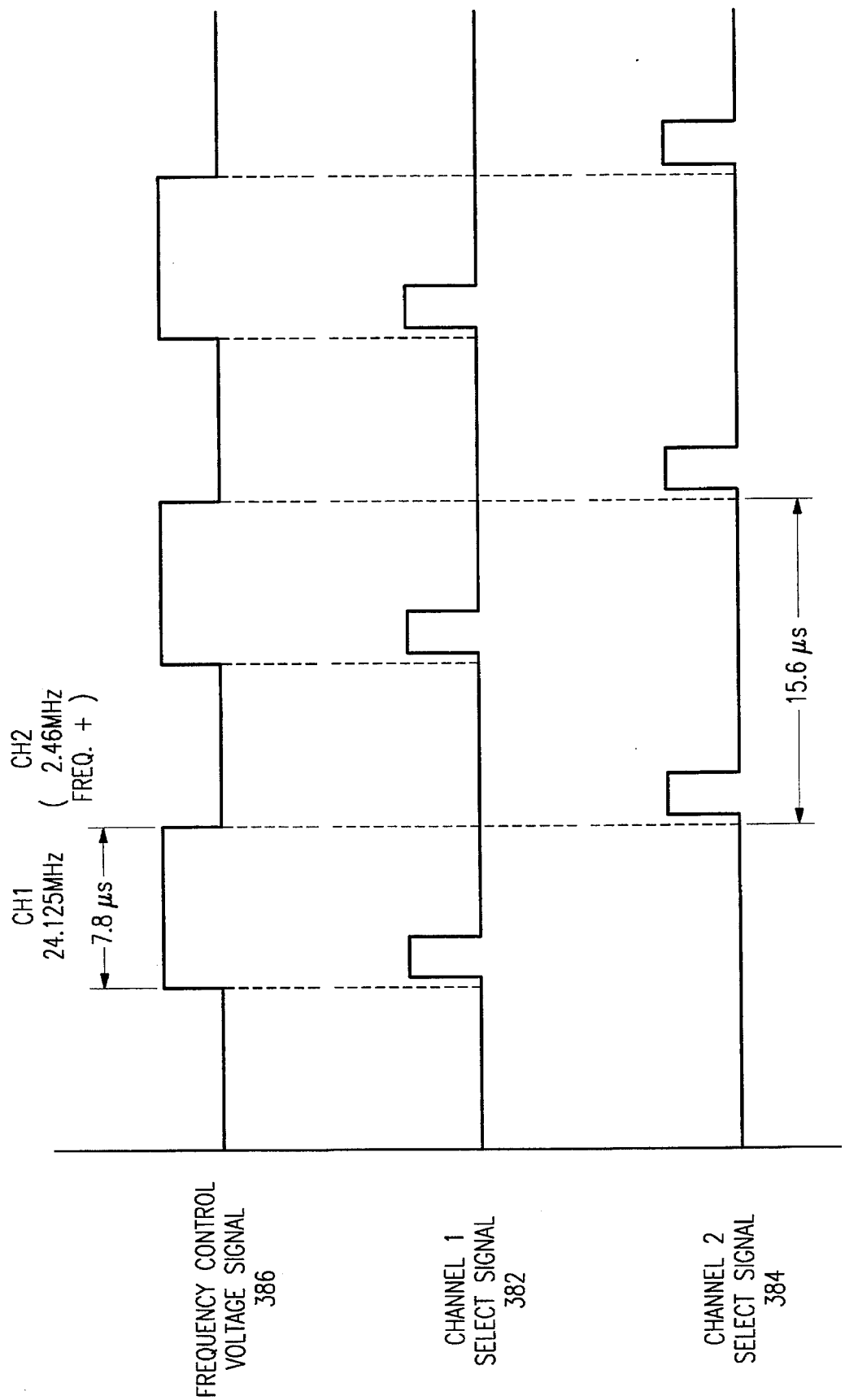

SMART BLIND SPOT SENSOR WITH OBJECT RANGING

RELATED APPLICATION

This application is a continuation-in-part of application Ser. No. 08/111,826 of Allan G. Pakett, filed Aug. 25, 1993, entitled SMART BLIND SPOT SENSOR, now U.S. Pat. No. 5,325,096, which is a file wrapper continuation of Ser. No. 07/930,079, filed Aug. 14, 1992, entitled SMART BLIND SPOT SENSOR now abandoned.

BACKGROUND OF THE INVENTION

1. Field of the Invention

This invention relates to automotive radar systems, and more particularly to a radar system for sensing the presence of obstacles in a vehicle's "blind spots".

2. Description of Related Art

A continuing problem that presents itself to operators of automotive vehicles is the difficulty in seeing obstacles near the vehicle but in a location that is difficult to observe from the driver's seat. Such regions are commonly referred to as "blind spots". For example, the angles between 90° and 170° from the forward direction of a vehicle (i.e., to the right of the vehicle and slightly behind the operator thereof) is a common blind spot, particularly for large vehicles such as buses and tracks. This right-side blind spot is a source of numerous accidents when a driver makes a right-hand turn or a right lane change and does not see another vehicle in the blind spot. Another common blind spot is the rear of a vehicle when backing up.

The most common solution to the problem of blind spots has been to use mirrors to aid the operator of the vehicle in determining whether obstacles are present in a blind spot. Such mirrors have been made in a variety of shapes and mounted in various locations to provide the operator with the greatest ability to detect obstacles in particular blind spots. For example, it is common place today to see a concave mirror mounted to the right side of a vehicle aimed at the right-side blind spot. Mirrors provide the operator with some information regarding the presence of obstacles in certain of a vehicle's blind spots, but they are less useful at night and under adverse weather conditions. Hence, a more complete and satisfactory solution is still sought by many.

A known alternative to the use of mirrors to detect obstacles in a vehicle's blind spot is to mount a camera on the vehicle to provide the operator with a visual image of obstacles in the vehicle's blind spot. However, this solution is complex and expensive, requiring a video camera and video monitor. Further, a video monitor can present a complex image that must be interpreted by a driver, and such monitors can be distracting. Moreover, like mirrors, such camera systems are less useful at night and under adverse weather conditions.

Therefore, there is presently a need for a simple, and inexpensive solution to the problem of detecting hazardous obstacles in the blind spots of a vehicle. Such a solution should also be useful at night and under adverse weather conditions. The present invention provides such a solution.

SUMMARY OF THE INVENTION

The present invention is a simple, compact, and inexpensive radar detection system configured to detect the presence of an obstacle in a vehicle's blind spots and generate a signal to the vehicle operator indicative of the presence of such an obstacle.

The system uses a common radar transceiver that transmits a pulsed radio frequency (RF) signal directed at a blind spot of the vehicle. The signal is reflected off any obstacles that are present in that blind spot region. The frequency of the transmitted signal is compared with the frequency of a reflection of the transmitted signal to determine whether the reflected signal has been Doppler shifted. A Doppler shift in the frequency generally indicates that an obstacle has moved into the blind spot. The preferred embodiment has a signal processor which determines the range that a potentially dangerous object is from the vehicle. The blind spot sensor ignores objects which are beyond a pre-determined range from the vehicle. The blind spot sensor preferably detects objects within a range between 0.25 and 100 feet at a resolution of approximately 0.55 feet.

Analog filters, digital circuits and computer software are used to filter out Doppler frequencies attributable to objects which are of no interest, such as stationary objects (for example, parked cars, road signs, and road side trees). Only obstacles that are traveling in the same direction and within a few miles per hour of the host vehicle are considered to be of interest. Therefore, it is only these obstacles that will cause the blind spot sensor to generate an indication that an obstacle is present in the blind spot.

The indication that is communicated to the vehicle operator is preferably an unobtrusive illuminated indicator which, in the preferred embodiment of the present invention, is affixed to or mounted near one of the vehicle's side mirrors. Having the indicator affixed in this manner allows it to be seen by a normal, practiced motion of the driver's head. However, the operator is not distracted or disturbed by the frequent indications of obstacles which may occur under normal traffic conditions, and which are of little or no interest to the operator unless a maneuver is planned which would cause the vehicle to come into contact with the obstacle. In addition to the illuminated indicator affixed to or mounted near a side mirror, an obtrusive audible indicator is provided in the preferred embodiment of the present invention which creates an audible tone, whistle, or buzz when an obstacle is present and the vehicle's turn signal is active.

A malfunction detector is also included in the inventive blind spot sensor. The malfunction detector monitors circuit output of the preamplifier to ensure that it is within expected limits, thereby determining whether the system is functioning properly.

The details of the preferred embodiments of the present invention are set forth in the accompanying drawings and the description below. Once the details of the invention are known, numerous additional innovations and changes will become obvious to one skilled in the art.

BRIEF DESCRIPTION OF THE DRAWINGS

FIG. 2b is a timing diagram of the receive channel signals which are coupled to the demodulator/sample and hold circuit 48 of FIG. 2a.

FIG. 3 is a flow chart of the procedure followed by the microprocessor shown in FIG. 2a.

FIG. 5a is a timing diagram of the frequency shift voltage pulse signal which is coupled to the dielectric resonant oscillator 1 of FIG. 1 referenced to the Channel 1 and Channel 2 select signals.

Like reference numbers and designations in the various drawings refer to like elements.

DETAILED DESCRIPTION OF THE INVENTION

Throughout this description, the preferred embodiment and examples shown should be considered as exemplars, rather than as limitations on the present invention.

Figure 1:
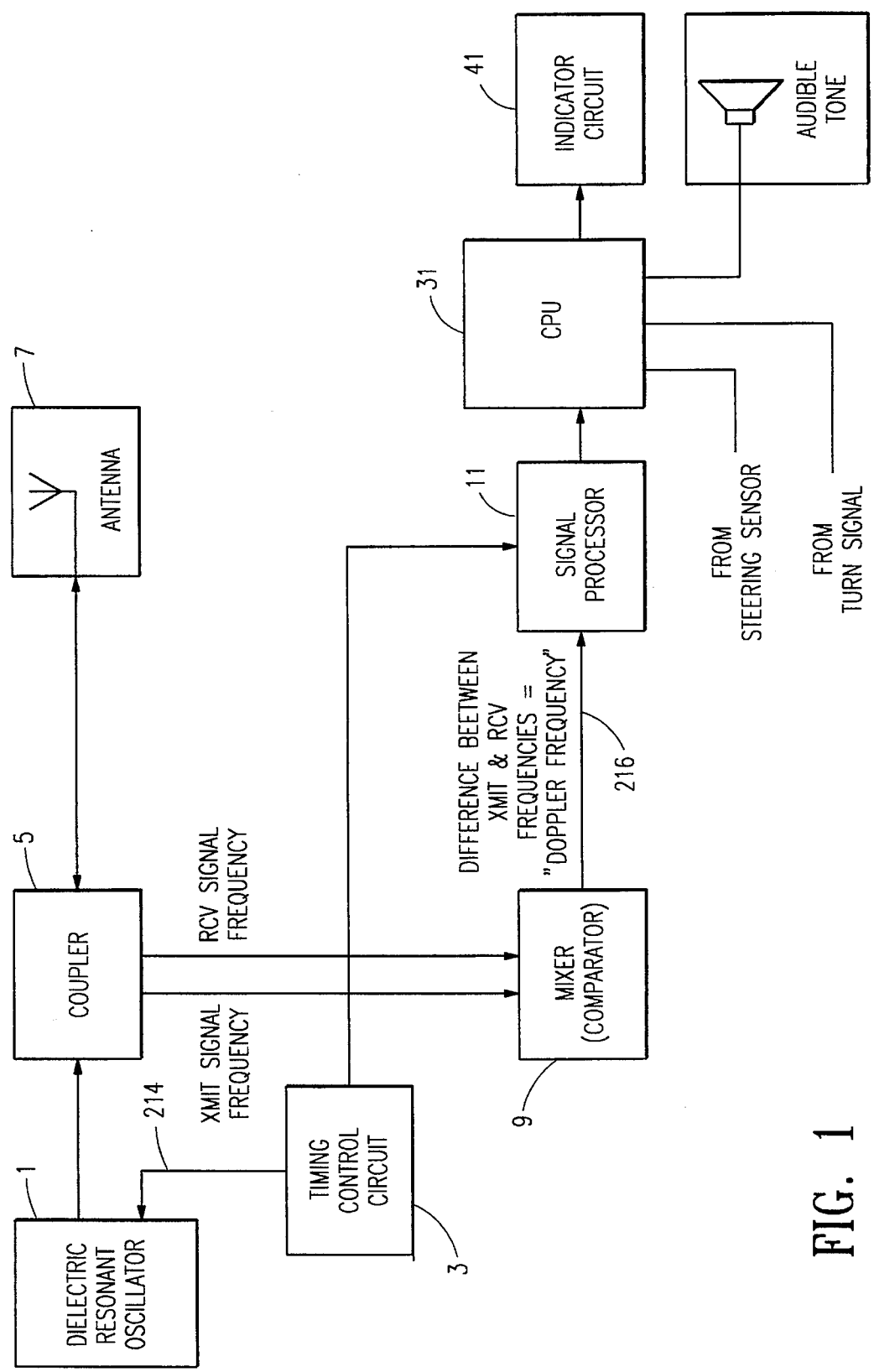
FIG. 1 is a simplified block diagram of the preferred embodiment of the present invention.

FIG. 1 is a block diagram of the preferred embodiment of the present invention. The preferred embodiment shown in FIG. 1 includes a radar transceiver which determines the presence or absence and the range of a target object. However, in an alternative embodiment of the present invention, the transceiver may emit and receive electromagnetic signals to other frequencies, or signals other than electromagnetic radiation, such as ultrasonic or infrared radiation. Such transceivers are well known in the art and are used for detection of objects in the context of alarm systems, for example.

In FIG. 1, a dielectric resonant oscillator (DRO) 1 generates a pulsed radio frequency (RF) transmit signal based upon an input provided to the DRO 1 from a timing control circuit 3. The frequency shift of the transmit signal is a function of a frequency control voltage pulse coupled to the DRO 1 from the timing control circuit 3 on a frequency control voltage pulse line 214. In the preferred embodiment, the voltage pulse that is presented to the DRO 1 on the frequency control line 214 alternates between at least two voltage levels, thereby causing the transmit frequency to alternate between at least two pulsed frequencies. In one embodiment, the timing control circuit 3 pulses for a duration of 10 μs at a rate of 10 kHz (i.e., the timing control signal on the frequency control line 214, and consequently the RF transmit signal output by the DRO 1, has a 10% duty cycle). A 10% duty cycle was chosen to optimize the energy efficiency of the system. The RF transmit signal is coupled to an RF coupler circuit 5 which permits RF energy to be coupled from the DRO 1 to an antenna 7 and an RF mixer diode 9.

The antenna 7 directs the RF transmit signal along a side of a vehicle upon which the radar system is mounted. In the illustrated embodiments of the present invention, a single antenna is used to transmit a RF signal, and is mounted to provide the most effective coverage of a blind spot of a particular vehicle. However, in an alternative embodiment of the present invention intended for use with large vehicles, such as busses, a plurality of transceivers may be used to ensure that obstacles which are present anywhere within the vehicle's blind spots are detected. The RF transmit signal is reflected off obstacles in the path of the signal. The antenna 7 receives a portion of the reflected signal. If an obstacle which reflects the transmit signal is in motion relative to the antenna 7, a Doppler frequency shift occurs between the transmitted signal and the received signal. Doppler shifting is a well-known phenomenon by which a signal which is reflected off an object which is approaching the source of the signal is compressed, thereby causing the frequency of the signal to be shifted upward. Likewise, the frequency of a signal that is reflected off an object that is moving away from the source is shifted downward.

The reflections of the RF transmit signal which are received by the antenna 7 are coupled to the RF coupler circuit 5, which in turn couples the received reflections to the RF mixer diode 9. In the preferred embodiment of the present invention a Doppler detection module, such as part no. DRO1000 marketed by Marconi Limited, includes the RF antenna 7, the RF coupler circuit 5, the DRO 1, and the mixer diode 9 in a single housing.

The output of the mixer diode 9 is coupled to a signal processing section 11. The signal processing section 11 amplifies, time demultiplexes, and filters the output of the mixer diode 9. The signal processing section 11 is coupled to a central processing unit (CPU) 31. In the preferred embodiment, the signal processor 11 determines whether the object is within a predetermined range of the vehicle. If the object is within range, the signal processor 11 signals the CPU 31. The CPU 31 is coupled to an indicator circuit 41 which presents warnings to the vehicle operator. Large objects reflect a greater amount of energy back to the antenna 7 than do smaller objects. Prior art blind spot sensors have had difficulty distinguishing between small objects (e.g., motorcycles) which are relatively close to the antenna 7 (e.g., in the next lane) and larger objects (e.g., trucks) which are relatively far from the antenna 7 (e.g., at least two lanes away). Unless a blind spot sensor determines both the range and presence of potentially dangerous objects, it may falsely indicate that a relatively large object is within a danger zone when in reality the object is at a distance which does not pose a threat to the vehicle. Therefore, the present invention preferably determines both the presence and range of potentially dangerous objects, and warns the vehicle operator only if an object is within a range which poses a threat to the vehicle.

In the preferred embodiment of the present invention, the signal processor 11 detects the distance to a potentially dangerous object. Objects that are beyond a specified range are disregarded. Thus, objects that are outside the blind spot (i.e., two lanes from the vehicle), but which are highly reflective due to their size will not cause the blind spot sensor to falsely indicate the presence of an obstacle in the blind spot. In one such embodiment, a pulsed signal is applied to the input of the DRO 1, causing the DRO 1 to change its pulsed frequency in a relationship to time for a first period. After the first period, the pulsed modulation signal voltage level causes the DRO 1 to change the frequency pulse relationship to time for a second period, which is equal to the first period duration.

To perform object detection and ranging, the transmitter preferably produces a transmit pulsed signal which alternates between two frequencies, referred to as channel 1 and channel 2. The channel 1 frequency is preferably 10.52254

GHz. The channel 2 frequency is preferably 2.46 MHz greater in frequency than the channel 1 frequency, or 10.525 GHz. The reflections of the multi-frequency RF transmit signal are received by the antenna 7 and are coupled to the RF coupler circuit 5, which in turn couples the received signals to a mixer diode 9 in the microwave detection unit 49. The mixer diode 9 produces a composite doppler signal on signal line 66 which has frequencies equal to the difference between the frequencies of the transmit and the receive signals.

Figure 2A:
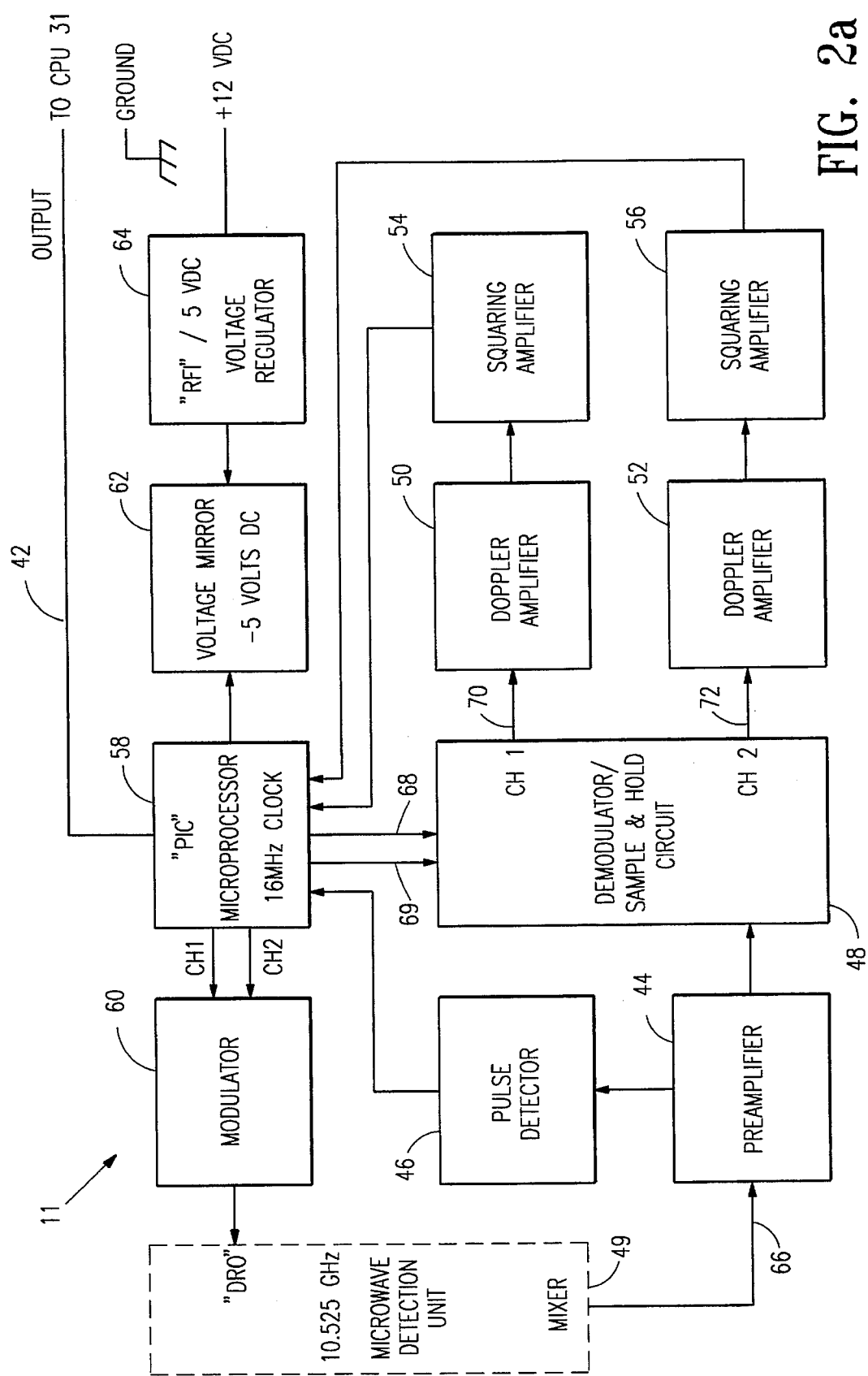
FIG. 2a is a detailed block diagram of the preferred signal processing section of the present invention which uses a ranging circuit processor to determine the range of objects.

The preferred embodiment of the signal processor 11 is shown in FIG. 2a. The preferred signal processor 11 detects both the presence and the range of objects and transmits a signal to the CPU 31 over output line 42 whenever an object of interest is within range of the vehicle. The preferred signal processor 11 is comprised of a preamplifier 44, a pulse detector 46, a demodulator/sample and hold circuit 48, two Doppler amplifiers 50, 52, two symmetrical squaring amplifiers 54, 56, a PIC microprocessor 58, a modulator 60, a voltage mirror circuit 62, and a voltage regulator 64. In the illustrated embodiment, the DRO 1, coupler 5, antenna 7, and mixer 9 (FIG. 1) are included in a microwave detection unit (MDU) 49 which performs mixing, coupling, transmit and receive functions. The microwave detection unit (MDU) 49 has a radio frequency transmitter comprised of a dielectric resonant oscillator, DRO or other oscillator circuit, coupled to a receiver unit.

The preferred signal processor 11 determines whether an object is within range of the vehicle as follows. The composite doppler signal produced by the mixer diode 9 in the microwave detection unit 49 is amplified by the preamplifier 44 and demodulated by the demodulator/sample and hold circuit 48 into two receive doppler signals, a channel 1 and a channel 2 receive doppler signal. The receive doppler signals are then digitized and coupled to the microprocessor 58 which calculates the range of an object based upon the phase relationship between the channel 1 receive doppler signal and the channel 2 receive doppler signal. The microprocessor 58 determines whether the object is within a pre-determined range which warrants warning the vehicle's operator. If the object is within range, the microprocessor 58 transmits a warning signal to the CPU 31 over a signal line 42. The CPU 31 subsequently warns the vehicle operator via an indicator circuit 41.

In the preferred embodiment, the signal processor 11 calculates ranges up to approximately 100 feet with approximately 0.55 feet resolution. The maximum range and resolution that can be calculated by the signal processor 11 is dependent upon the difference between the transmit frequencies of channel 1 and channel 2. The greater the differential between the two transmit channel frequencies, the greater the ranging resolution. However, the maximum range that can be calculated by the signal processor 11 is inversely proportional to the differential between the two transmit channel frequencies. Therefore, the frequency differential between the two transmit channels in the preferred signal processor 11 is set at approximately 2.46 MHz and yields a desirable range maximum of approximately 100 feet and an acceptable resolution of approximately 0.55 feet/degree.

Figure 2B:
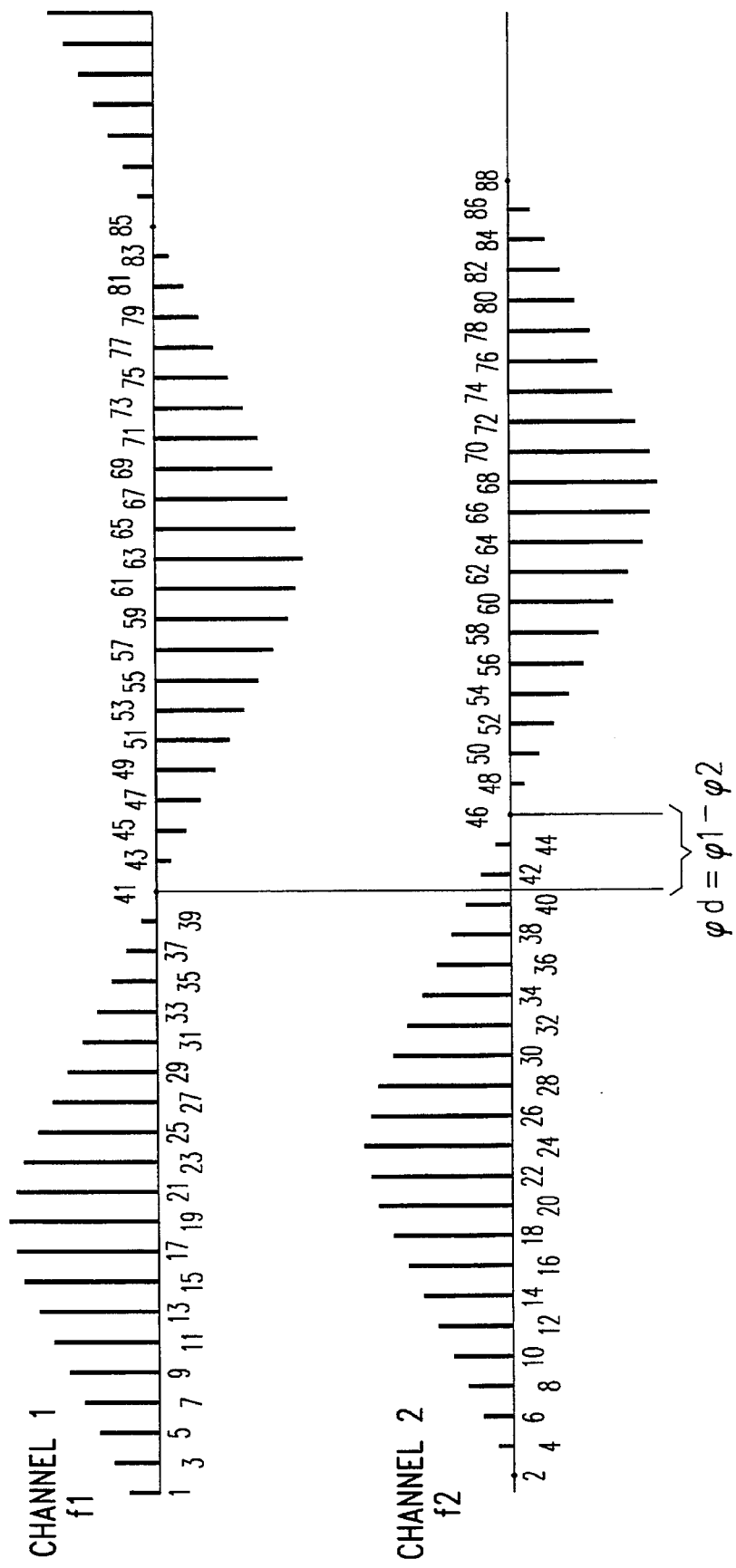

The receive signal generated by the mixer 9 within the microwave detection unit 49 is transmitted at very low voltage levels, approximately between 10 to 20 millivolts. The low voltage signal is amplified by the preamplifier 44 which boosts the receive signal to between approximately 100 to 300 millivolts. The boosted receive signal consists of two receive channels, each channel producing a series of 10 µS impulse signals. As shown in FIG. 2b, the impulse signals are generated at two different frequencies, f1 and f2. The amplitude of the impulse signals received by each channel (i.e., channel 1 and channel 2) define an envelope sine wave signal corresponding to the Doppler frequency of its respective channel. During normal operation as shown in FIG. 2b, the two receive channel signals are typically out of phase with each other. The phase differential (i.e., $\partial1-\partial2$) between the two receive channel signals is proportional to the range that an object is from the vehicle. As shown in FIG. 2a, the boosted receive signal is coupled to the demodulator/sample and hold circuit 48.

The demodulator circuit within the demodulator/sample and hold circuit 48 contains two signal switches (not shown), one for channel 1, and one for channel 2. The signal switches are controlled by switch timing control signals which are generated by the microprocessor 58 and coupled to the signal switches over control lines 68 and 69. The microprocessor 58 synchronizes the switch timing control signals with the transmit signals generated by the DRO 1 by concurrently generating both transmit timing control signals (which are coupled to the DRO 1 via modulator 60) and the switch timing control signals (which are coupled to the signal switches over control lines 68, 69). By synchronizing the frequency of the transmit signals with the switching of the two signal switches, the microprocessor 58 causes the boosted receive signal which is produced by the preamplifier 44 to be demodulated into the two separate Doppler frequency signals, a channel 1 Doppler frequency signal, and a channel 2 Doppler frequency signal as shown in FIG. 2b. The Doppler frequency signals are coupled to the doppler amplifiers 50, 52.

The sample and hold circuit samples the Doppler signals at predetermined intervals, preferably at 5 KHz rate per channel. By sampling the Doppler signals at the preferred sampling frequency, the sample and hold circuit integrates the pulses produced by the demodulator circuit and generates a smooth sine wave Doppler signal associated with each channel.

In the preferred embodiment of the signal processor 11, the signal switches alternatively couple the sine wave Doppler signals to two low-pass filters, a channel 1 low-pass filter and a channel 2 low-pass filter. The channel 1 sine wave Doppler signal is connected to the channel 1 low-pass filter for approximately 10 µS and is synchronized to the time when the transmit signal produced by the DRO 1 is at the channel 1 frequency. The channel 2 sine wave Doppler signal is alternatively connected by the microprocessor 58 to the channel 2 low-pass filter for approximately 10 µS and is synchronized to the time when the transmit signal produced by the DRO 1 is at the channel 2 frequency. Hence, the demodulator/sample and hold circuit 48 time demultiplexes the channel 1 and channel 2 receive signals.

The low-pass filters preferably have a 3 dB cutoff frequency of approximately 96 Hz. The filters reconstruct (or "smooth") channel 1 or channel 2 Doppler signals by acting as an envelope detector. That is, the composite of the samples taken by the signal switches under the control of the microprocessor 58 creates an envelope that is essentially below the 3 dB cutoff frequency of the low-pass filters. Therefore, the output of each filter is a smooth Doppler signal having a frequency equal to the Doppler frequency of the channel associated with that filter (i.e., the difference between the frequency of the transmit signal and the frequency of the receive signal for each channel).

For example, the channel 1 low-pass filter outputs a smooth Doppler signal having a frequency equal to the difference between the channel 1 transmit and receive frequencies. The channel 2 low-pass filter outputs a smooth Doppler signal having a frequency equal to the difference between the channel 2 transmit and receive frequencies. In the illustrated embodiment, the low-pass filters are located in the Doppler amplifiers 50 and 52. Alternatively, the low-pass filters can be an integral part of the demodulator/sample and hold circuit 48. The Doppler signals are preferably coupled to high-pass filters having cut-off frequencies of approximately 1.5 Hz. The high-pass filters eliminate unwanted noise from the Doppler signals. The channel 1 and channel 2 Doppler signals are coupled to the Doppler amplifiers 50, 52 over signal lines 70, 72, respectively.

The Doppler signals produced by the demodulator/sample and hold circuit 48 are relatively low level voltage signals, approximately 100 to 200 millivolts peak-to-peak. The Doppler amplifiers 50, 52, amplify the Doppler signals to approximately 3 volts peak-to-peak. The amplifiers 50, 52, are coupled to the symmetrical squaring amplifiers 54, 56, as shown in FIG. 2a. The symmetrical squaring amplifiers 54, 56, convert filtered Doppler signals produced by the demodulator/sample and hold circuit 48 and amplified by Doppler amplifiers 50, 52, into square wave signals by comparing the Doppler signal to zero volts. Preferably, the components which comprise the symmetrical squaring amplifiers 54, 56 are very closely matched to one another to prevent the introduction of a phase shift to the Doppler signals of one channel relative to the other channel. For example, the capacitors used in implementing the squaring amplifiers 54, 56 preferably have a 5% or less tolerance. Similarly, the resistors used in implementing the squaring amplifiers 54, 56 preferably have a 1% or less tolerance.

The square-wave outputs of the squaring amplifiers 54, 56 are coupled to the microprocessor 58. The microprocessor 58 determines the range of a target object by calculating the phase difference between the two signals generated by the squaring amplifiers 54 and 56. The range of a given object is directly proportional to the phase difference between the channel 1 and channel 2 receive Doppler signals output from the squaring amplifiers 54 and 56. The microprocessor 58 calculates the phase difference, and thus the object's range, by executing a set of instructions discussed in more detail below with reference to FIG. 3. The microprocessor 58 is preferably comprised of a reduced instruction set microcontroller which is capable of operating at approximately 20 MHz. In the preferred embodiment, the microprocessor 58 is implemented using a PIC16C54, available from Microchip Technologies, Chandler, Ariz. The preferred microprocessor 58 operates at 16 MHz, and executes instructions at a rate of approximately 250 ns per instruction. In an alternative embodiment, the microprocessor 58 is implemented using an integrated circuit (e.g., a gate array, FPGA or other ASIC device) specifically designed to determine the range of an object. However, any means for detecting the phase difference between two digital signals may be used.

For example, in one alternative embodiment, the phase difference between the two channels is calculated by means of Fast Fourier Transform (FFT) (or other Fourier transforms) digital signal processing schemes. Other alternative embodiments calculate the phase difference using phase-locked-loops (PLLs) and other narrowband sum/difference processing schemes. Alternatively, the phase difference can be calculated using 90° quadrature (i.e., complex) signal components for each channel (sometimes referred to as "I" and "Q" channels for "In Phase" and "Quadrature" channels). In this embodiment, the phase difference is determined whether the quadrature signals are processed at RF, IF, baseband or digitally.

As discussed above, the microprocessor 58 synchronizes the transmit and receive signals by concurrently controlling the operation of the DRO 1 and the demodulator/sample and hold circuit 48. The microprocessor 58 is synchronized to an internal system clock (not shown). After calculating the range of an object, the microprocessor 58 determines whether an object is within a pre-determined range. If the object is within range, the microprocessor 58 asserts a signal which is coupled to the CPU 31 by signal line 42. The CPU 31 and subsequently warns the vehicle's user of the proximity of the object as described below with reference to FIG. 9.

The output signal transmitted on line 42 remains in an inactive state until the microprocessor 58 determines that an object is within a range that requires that the CPU 31 warn the vehicle's operator. If the microprocessor 58 determines that an object is within a hazardous range the microprocessor 58 outputs a signal on line 42 which has a frequency of approximately 100 Hz and a duration of approximately 2 seconds. The microprocessor 58 produces this signal by triggering a software timer one-shot in the microprocessor 58. The illustrated embodiment is intended to be used with a CPU 31 which expects a Doppler frequency signal of between approximately 2 Hz and 96 Hz whenever an object is present in the blind spot. Therefore, to be compatible with such a CPU 31, the output signal is an approximately 100 Hz signal. One skilled in the art will appreciate that the output signal generated by the microprocessor 58 via signal line 42 may alternatively be a binary signal having a steady logic state indicative of the presence or absence of a target of interest. The microprocessor 58 is coupled to the squaring amplifiers 54, 56 and samples the Channel 1 and Channel 2 receive Doppler signals.

The microprocessor 58 measures the phase difference between the two receive Doppler signals to determine the range of a target object. Range information is preferably calculated by averaging over three range readings. In the illustrated embodiment, objects that move 2 mph faster than the host vehicle produce a receive Doppler frequency which is greater than 56 Hz. By filtering out receive channel frequencies which are greater than 56 Hz the microprocessor 58 ignores objects that move at a speed greater than 2 mph relative to the host vehicle. Therefore, only objects that are within range and are moving at a relative speed of less than 2 mph trigger the output on line 42.

The signal processor 11 shown in FIG. 2a has a built-in-test (BIT) facility for testing whether the ranging circuit is functioning properly. The pulse detector 46, together with the microprocessor 58, monitors the operation of the DRO 1, the coupler 5, and mixer 9 within the microwave detection unit 49, and the preamplifier 44. The pulse detector 46 is coupled to the output of the preamplifier 44. The pulse detector 46 tests whether the preamplifier 44 generates impulse signals corresponding to the mixer DC offset voltage. If no impulse signals are detected by the pulse detector 46, it can be assumed that a failure has occurred in either the MDU 49 or the preamp 44. In such a case, the pulse detector 46 transmits a logic low level signal to the microprocessor 58. However, if the pulse detector 46 detects impulse signals, a logic high level signal is transmitted to the microprocessor 58. The microprocessor 58 periodically polls this test signal to determine whether the ranging circuit is functioning properly. If a low level signal is detected, the microprocessor 58 informs the CPU 31 and continues to poll the signal until a high level signal is generated. In the preferred embodiment, the microprocessor 58 tri-states the output signal which is coupled to the CPU 31 whenever the pulse detector 46 indicates that the ranging circuit is malfunctioning. The microprocessor 58 maintains its output at a high impedance state until the preamplifier 44 generates impulse signals.

The voltage mirror or voltage inverter 62, together with the regulator 64, provide a well regulated low-noise direct current power source to the signal processor 11. An external 12-volt power supply is provided to the regulator 64. The regulator 64 produces a 5-volt direct-current power source which is coupled to the voltage mirror 62. The voltage mirror 62 is a switched-capacitor power supply which derives a −5 VDC power source from the 5 VDC power source. The switching frequency of the voltage mirror 62 is controlled by the microprocessor 58 and is synchronized to the sampling frequency of the sample and hold circuit. The "ripple" AC signals which are typically generated by DC power supplies are minimized by the illustrated signal processor because the operation of the voltage mirror 62 is synchronized to the operation of the sample and hold circuit. The "beat" frequencies that otherwise may have been introduced by the switched-capacitor power supply of the voltage mirror 62 are eliminated because the switching of the switches in the voltage mirror 62 is synchronized with the switching of the switches in the sample and hold circuit. As a result, the power provided to the Doppler amplifiers 50, 52 and the preamplifier 44 by the voltage mirror 62 is a steady low-noise DC voltage source.

Figure 3:
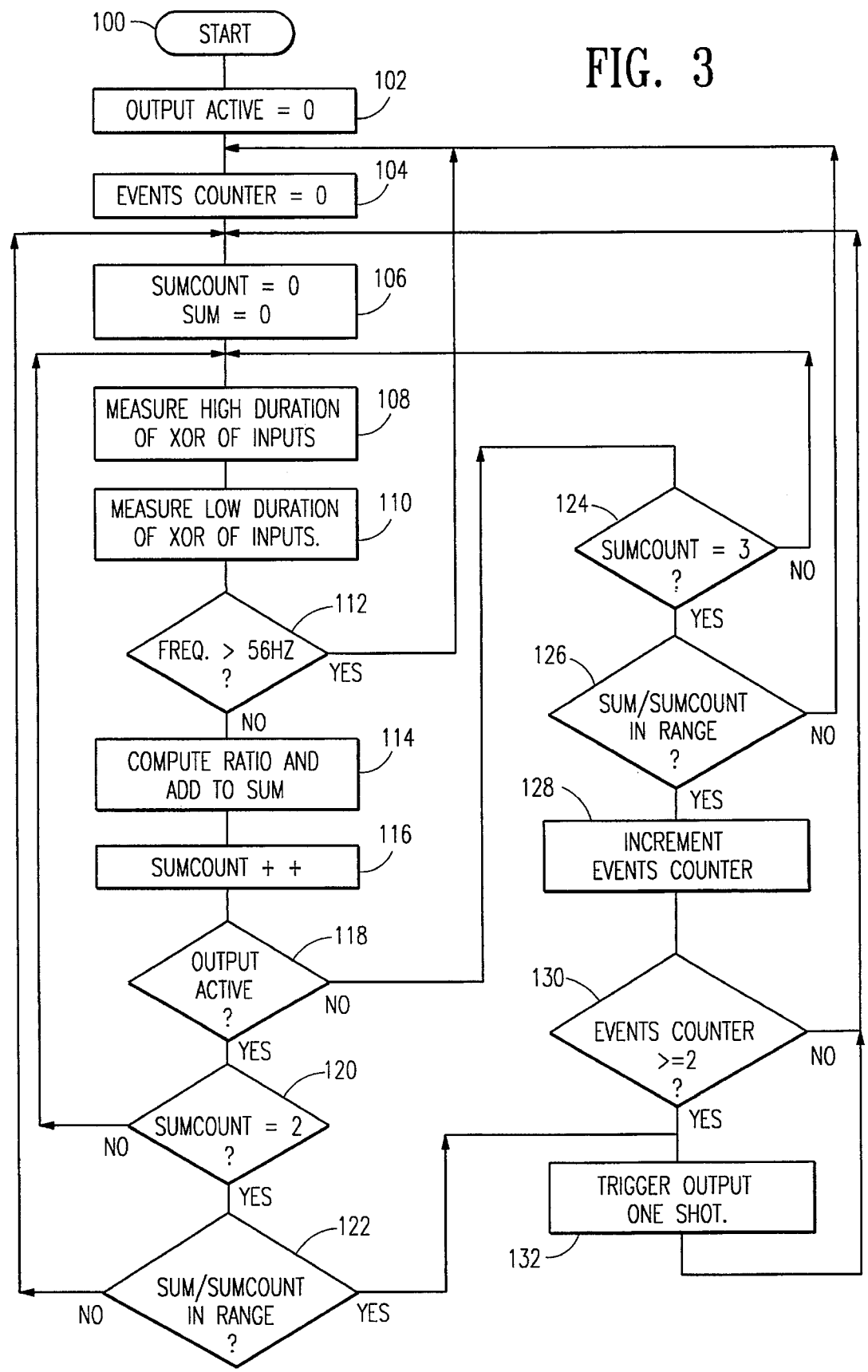

Referring now to FIG. 3, the operation of the microprocessor 58 is shown. At system stamp (state 100), the microprocessor 58 enters state 102. At state 102, a logic low (0) value is output to the CPU 31 which indicates that there is no object within a range of the antenna 7 that requires attention by the CPU 31.

The microprocessor 58 initializes three counters in states 104 and 106. In state 104 the microprocessor 58 initializes the "EVENTS COUNTER" to zero. In state 106, the microprocessor 58 initializes both the "SUM COUNT" and "SUM" counters to zero. In states 108 through 114, the microprocessor 58 calculates the phase difference between the Channel 1 and Channel 2 receive Doppler signals. The microprocessor 58 determines the phase difference using techniques similar to a digital phase detector. The microprocessor 58 performs a logical exclusive-or function on the two receive channel Doppler signals. In states 108 and 110, the microprocessor 58 measures the duty cycle of the exclusive-or output of the two receive signals by measuring the high duration of the exclusive-or output in state 108, and by measuring the low duration of the exclusive-or output in state 110. In state 112, the microprocessor 58 determines whether an object is moving faster than 2 mph relative to the vehicle by determining whether the receive Doppler frequency is greater than 56 Hz. If the frequency is greater than 56 Hz, control returns to state 104 and the microprocessor 58 initializes the counters as discussed above. However, if the receive Doppler signal has a frequency which is less than 56 Hz, the microprocessor 58 determines the phase difference between the two receive Doppler signals by computing the ratio of the high duration to low duration of the exclusive-or output in state 114. The computed ratio is added to the "SUM" counter in state 114. The "SUM COUNT" is incremented in state 116. Upon computing three such ratios the "SUM COUNT" is divided by the "SUM" to determine the average of the three measured ratios.

The microprocessor uses different criteria to trigger the output one shot depending upon the current state of the one shot. If the one shot is not active, the microprocessor requires that two consecutive readings (each reading being the average of three cycles of the exclusive-or output) be within the defined range of phases in order to trigger the one shot. Once the one shot has been triggered, the microprocessor only requires that one reading (consisting of the average of two cycles) be within the required phase range in order to re-trigger the one shot and keep the output active.

For example, as shown in FIG. 3, in state 118, the microprocessor 58 determines whether the microprocessor one shot multi-vibrator output signal is already active. If the output signal is active, the microprocessor 58 need only calculate one additional range value before having three range values to average. If the output signal is not active, the microprocessor 58 needs to perform two additional range calculations. As shown in FIG. 3, if the output signal is inactive, control transfers from state 118 to state 124. In state 124, the value of "SUM COUNT" is checked, if "SUM COUNT" is not equal to 3, then control returns to state 108. Once three range values are calculated by the microprocessor 58, the three range values are averaged in state 126. If the average range is within the predetermined range of interest, the events counter is incremented in state 128. In state 130, if the events counter is greater than or equal to 2, then the one shot output is activated and the microprocessor 58 returns to state 106.

The events counter reduces false alarms by requiring that two consecutive sets of averages be within the desired phase range before triggering the output. Once the output has been triggered, the criteria for keeping the output active is relaxed.

Returning to state 118, if the output is active, then control continues to state 120. At state 120, the value of "SUM COUNT" is examined, and if the value of "SUM COUNT" does not equal 2, control returns to state 108. Thus, once three range values are calculated by the microprocessor 58, the three range values are averaged in state 122. If the average of the range values is within a predetermined range which warrants warning the vehicle's operator, a "one shot" output is triggered in state 132. This causes an approximately 100 Hz signal to be generated by the one shot on signal line 42 for a duration of approximately 2 seconds. This output signal is input to the CPU 31. The CPU 31 subsequently warns the vehicle's operator as described in more detail below with reference to FIG. 9.

Figure 4:
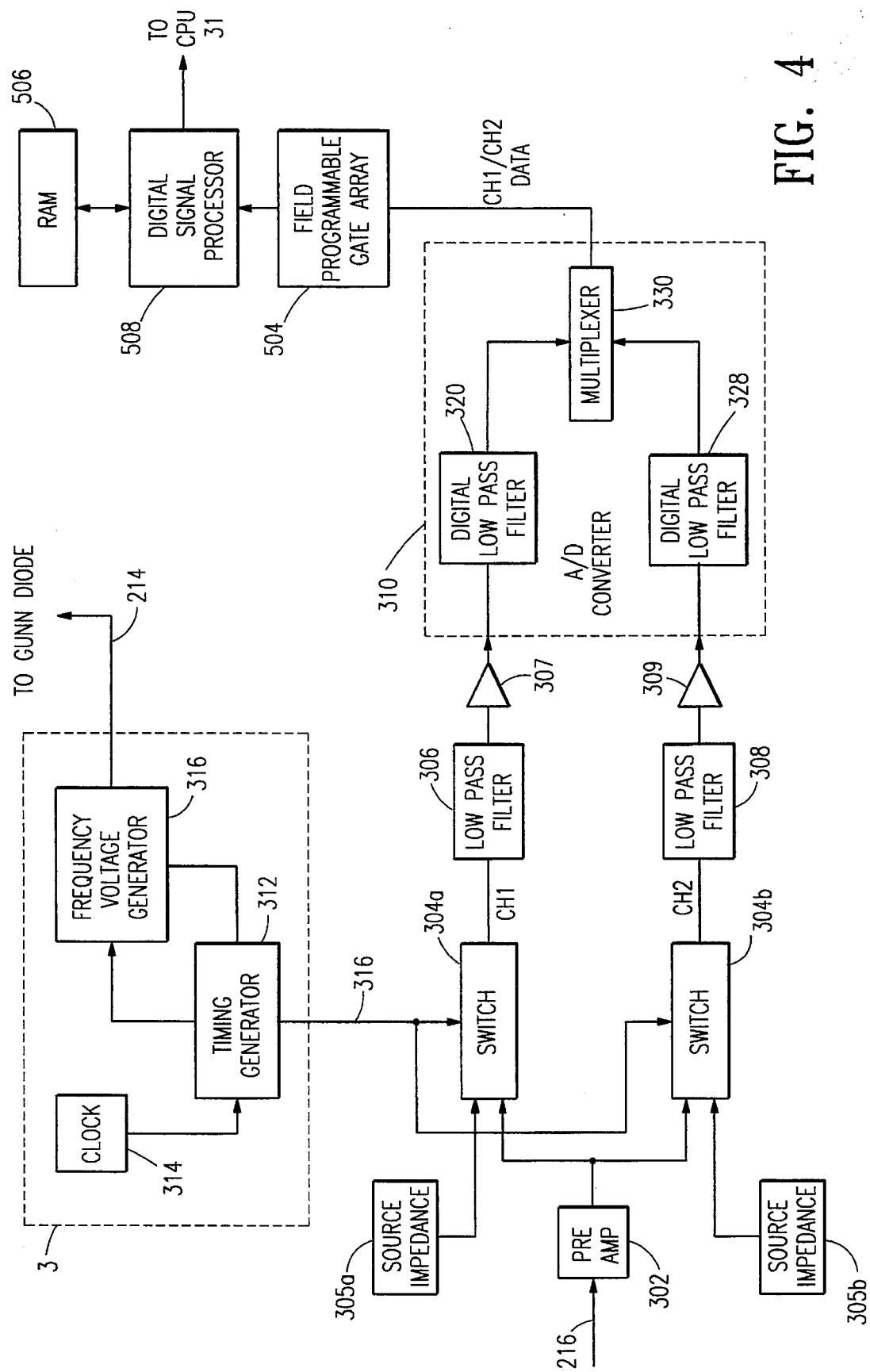
FIG. 4 is a detailed block diagram of an alternative embodiment of the signal processing section which uses a digital signal processor (DSP) to determine the range of objects of the present invention.

An alternative embodiment of the signal processor 11 is shown in FIG. 4. In the illustrated embodiment, a DSP 508 generates both Doppler frequency (opening/closing object rate) and range information. The timing control circuit 3 alternates between at least two voltage levels, causing the DRO 1 (FIG. 1) to output an RF frequency transmit signal which alternates between at least two corresponding frequencies. In the illustrated embodiment, the transmit signal produced by the DRO I preferably alternates between two frequencies of approximately 24.125 GHz and 24.12746 GHz. The lower of these frequencies is hereafter referred to as the channel 1 frequency, and the higher frequency as the channel 2 frequency. Thus, the channel 1 and channel 2 frequencies are preferably spaced approximately 2.46 MHz apart in the illustrated embodiment.

The reflections of the multi-frequency RF transmit signal are received by the antenna 7 and are coupled to the RF coupler circuit 5, which in turn couples the received signals to the RF mixer diode 9. The mixer diode 9 produces a difference signal on signal line 216 having frequencies equal to the difference between the transmit signal frequency and the receive signal frequency. The difference signal is demultiplexed by the signal processor 11 into two receive difference signals, a channel 1 and a channel 2 receive difference signal. The receive difference signals are digitized and coupled to a DSP circuit 508 within the illustrated signal processor 11. The signal processor 11 determines the range of an object by calculating the phase difference between the channel 1 receive difference signal and the channel 2 receive difference signal. The signal processor 11 is coupled to the CPU 31 which determines whether the object is within a range that warrants warning the vehicle operator via indicator circuit 41.

The signal processor 11 includes a preamplifier (preamp) 302, a channel 1 signal switch 304a, a channel 2 signal switch 304b, a channel 1 low pass filter 306, a channel 1 audio amplifier 307, a channel 2 low pass filter 308, a channel 2 audio amplifier 309, an analog-to-digital converter (A/D) 310, a field programmable gate array 504, a digital signal processor 508 and a high speed random access memory (RAM) 506. In the illustrated embodiment, the timing control circuit 3 includes a timing generator circuit 312, a clock circuit 314, and a frequency control voltage generator 316.

The output of the mixer 9 is coupled to the input of the preamp 302. The preamp 302 amplifies the receive signal coupled from the mixer 9. The preamp 302 preferably has a very low frequency response of approximately 0.5 Hertz, thereby permitting very low frequencies to be amplified. The output of the preamp 302 is coupled to both the signal switches 304a, 304b. The signal switches 304a, 304b time demultiplex the signal from the preamp 302 by alternatively coupling the preamp 302 to the channel 1 audio amplifier 307 and low pass filter 306, and to the channel 2 audio amplifier 309 and low pass filter 308. When one channel is coupled to filter 306, 308, the input of the other filter 308, 306 is coupled to a circuit 305a, 305b having an output impedance equal to the output impedance of the preamp 302 (and the input impedance of each filter 306, 308). Thus, a constant source impedance is seen by the filters 306, 308. By ensuring that the source impedance to each filter 306, 308 remains constant, the filters 306, 308 remain linear so the power of the intermodulation products of the Doppler frequencies of multiple targets created by the nonlinearity of the filters are held to a minimum (and ideally, eliminated).

FIG. 5a is a timing diagram showing the timing of the switch timing control signals 382, 384 with respect to a frequency control voltage signal 386 that is coupled to the DRO 1 via a frequency control voltage signal line 214. The paired switch timing control signals 382, 384 coupled to the respective paired signal switches 304a, 304b from the timing generator circuit 312 on switch timing control lines 318, determine to which filter 306, 308 the preamp 302 output is to be coupled, and the timing of such coupling. In the illustrated embodiment, the frequency control voltage signal 386 alternates between a relatively high voltage and a relatively low voltage at intervals of 7.8 μS. One period of the frequency control voltage signal 386 is equal to 15.6 μS. Therefore, the output frequency of the DRO 1 alternates between a relatively low frequency (the channel 1 frequency) and a relatively high frequency (the channel 2 frequency) at intervals of 7.8 μS as a function of the frequency control voltage.

The switch timing control signal on switch timing control line 318 includes a channel 1 select signal 382 and a channel 2 select signal 384. The channel 1 select signal 382 in the high state causes the preamp 302 output to be coupled to the channel 1 low pass filter 306 through the signal switch 304a. The channel 2 select signal 384 in the high state causes the preamp 302 output to be coupled to the channel 2 low pass filter 308 through the signal switch 304b. The signal switch 304 is synchronized to the frequency control voltage signal 386 generated by the timing generator circuit 312. Therefore, in the illustrated embodiment the signal switch 304 connects the preamp 302 to the channel 1 low pass filter 306 for approximately one-half of a period (7.8 μS), synchronized to the time when the transmit signal is at the channel 1 frequency. The signal switch 304 alternatively connects the preamp 302 to the channel 2 low pass filter 308 for approximately one-half of a period (7.8 μS), synchronized to the time when the transmit signal is at the channel 2 frequency. Hence, the signal switch 304 time demultiplexes the down convened channel 1 and channel 2 signals. Alternative embodiments, in which the length of the channel 1 and channel 2 select signal 382, 384 pulses are longer or shorter, are within the scope of the present invention.

Figure 5B:
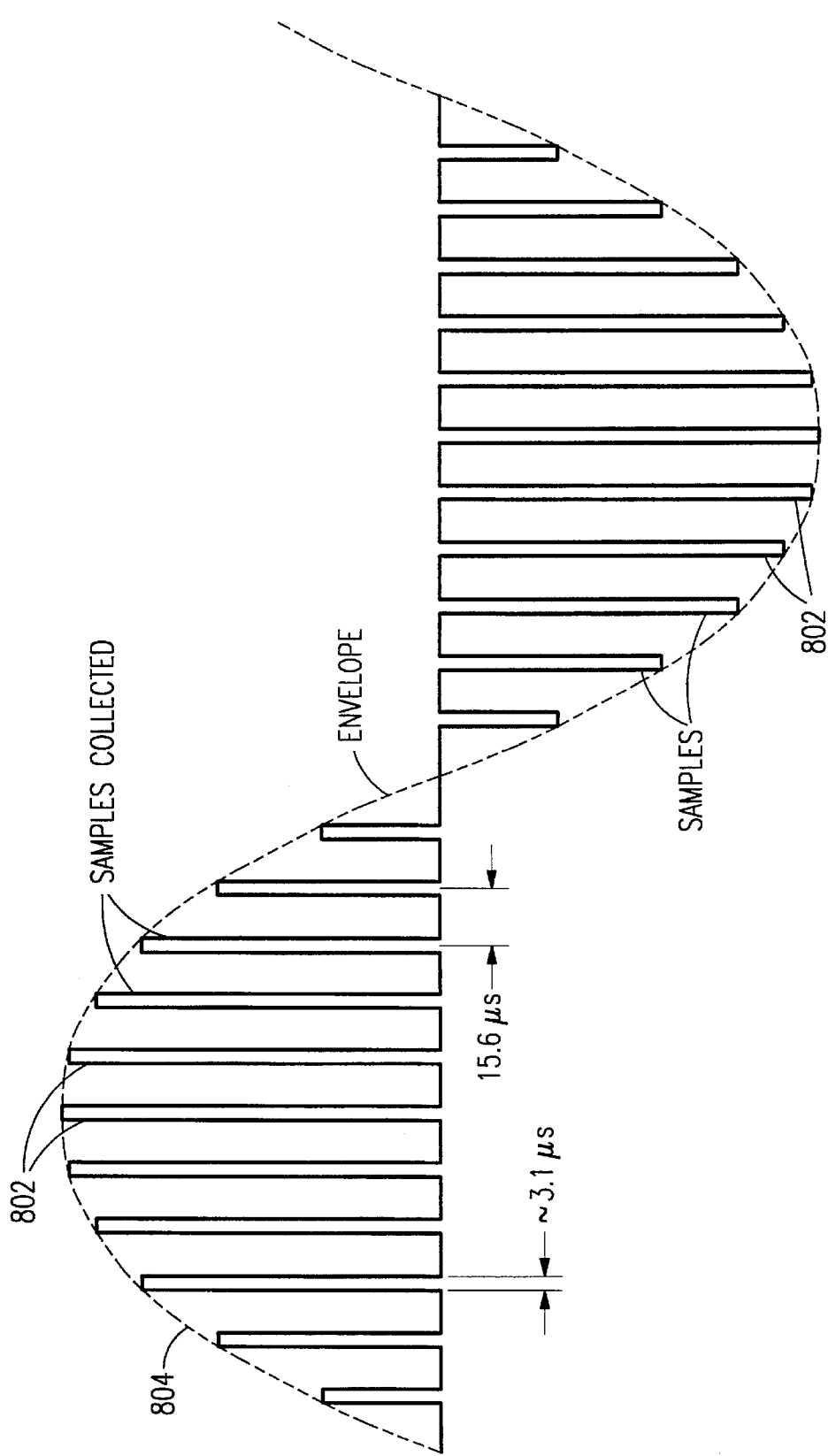
FIG. 5b is an illustration of the envelope of the output of one channel of the signal switch shown in FIG. 4.

In the illustrated embodiment, each filter 306, 308 has a 3 dB cutoff frequency of 23 kHz. The filters 306, 308 reconstruct the output of the signal switch 304 by acting as an envelope detector. The channel 1 low pass filter 306 reconstructs (or "smooths") the time demultiplexed down convened channel 1 signal and the channel 2 low pass filter 308 reconstructs the time demultiplexed down convened channel 2 signal as shown in FIG. 5b. The composite of the samples 802 taken by the signal switch 304 under the control of the channel 1 select signal 382 and the channel 2 select signal 384 creates an envelope 804 that is essentially below the 3 dB cutoff frequency of the low pass filters 306, 308. Therefore, the output of each filter 306, 308 is a smooth sine wave signal with frequency components equal to the difference between the frequency of the transmit signal corresponding to the channel associated with the filter and the frequency of each receive signal. For example, the channel 1 low pass filter 306 outputs a smooth sine wave signal having a frequency equal to the difference between the channel 1 transmit frequency and the channel 1 receive frequency.

The outputs of each filter 306, 308 are coupled to the A/D converter 310. The A/D converter 310 preferably includes two discrete channels corresponding to signal channels 1 and 2. Each channel of the A/D converter 310 converts the analog inputs from the corresponding down-convened frequency channel into a stream of digital data words. Digital low pass filters 320, 328 within the A/D converter 310 filter each channel, and a multiplexer 330 within the A/D converter 310 time multiplexes the digital data words from each of the A/D converter channels (i.e., the channel 1 and channel 2 digital data words are preferably interleaved). The low pass filters 320, 328 within the A/D converter 310 preferably have a 3 dB cutoff frequency of 7.5 kHz. These filters 320, 328, in conjunction with low pass filters 306, 308, ensure that the Nyquist criteria is satisfied with respect to the sampling frequency, thereby preventing aliasing when the FFT operation is performed (i.e., the effective sampling frequency from the A/D converter 310 should not exceed one-half the frequency of the Doppler frequency of interest).

The A/D converter 310 of the illustrated embodiment is an oversampling analog-to-digital converter. The output from the A/D converter 310 is a series of 32 bit data words. The first 16 bits represent the amplitude of the analog signal over a particular period of time (i.e., 16 bit resolution). Bits 17 through 19 indicate whether the A/D converter 310 is near saturation. Bits 20 through the 31 indicate whether the word is associated with channel 1 or channel 2. In alternative embodiments, the output of the A/D converter 310 is merely the digital representation of the input plus one bit that represents the channel of the A/D converter 310. The A/D converter 310 output in alternative embodiments may have fewer or more than 16 bits of resolution.

In one embodiment of the present invention, the digital output of the A/D converter 310 is preferably coupled to a field programmable gate array (FPGA) 504, such as the 3042PC84-70 FPGA manufactured by Xilinx. The FPGA 504 accepts digital data generated by the A/D converter 310 and stores the digital data in a high-speed random-access-memory 506 (RAM).

The digital data generated by the A/D converter 310 is transmitted as a synchronous serial data stream to the FPGA 504. A frame synchronization (frame sync) signal and a serial clock (bit sync) signal are generated by the timing generator circuit 312 and transmitted to the FPGA 504. The frame sync signal identifies the beginning of each digital data word transmitted from the A/D converter 310 to the FPGA 504, and the serial clock signal synchronizes each bit of each digital data word from the A/D converter 310 to the FPGA 504. The generation and use of frame synchronization and serial clock signals to communicate synchronous digital data is well known in the art.

The FPGA 504 preferably has a serial-to-parallel converter and a direct memory access controller (DMAC). The serial-to-parallel converter receives the stream of serial data words from the A/D converter 310 along with the frame synchronization and serial clock signals. The serial-to-parallel converter converts the serial data stream to a parallel format. The FPGA 504 is coupled to a Digital Signal Processor 508 (DSP), such as model DSP56001 manufactured by Motorola Incorporated. The DSP 508 is coupled to a clock 514 that determines the speed at which the DSP 508 operates. The DSP 508 of the illustrated invention operates at approximately 26 MHz. The FPGA 504 initiates DMA (direct memory access) requests to the DSP 508 whenever it has a complete data word to be written to the RAM 506. After writing a data word to the RAM 506, the FPGA 504 releases the bus 509 and allows the DSP 508 to regain control of the bus 509.

The RAM 506 locations in which the data words are written preferably are divided into data blocks having two memory areas, each area within a block associated with either the channel 1 or the channel 2 receive difference signal. The DMAC within the FPGA 504 reads a channel bit from each serial word and writes the word to the memory area associated with the channel designated by that channel bit. The channel bit alternates with each word read by the DMAC, and thus the memory area to which the word is written alternates causing the memory areas associated with each channel to fill concurrently.

When sufficient data is present in the RAM 506, the DSP 508 performs a Fast Fourier Transform (FFT) on each channel of digital data to determine the spectral content thereof. The FFT operation maps the digital representation of the time-demultiplexed receive signal from the time domain into the frequency domain (i.e., performs a spectral analysis of the signal and determines the frequencies and phase that are present and the relative power at each frequency). Performing FFT operations using digital signal processors, such as the DSP56001 used in the preferred embodiment of the present invention, is well known in the art as is demonstrated in *Implementation of Fast Fourier Transforms on Motorola's DSP56000/DPS56001 and DSP96002 Digital Signal Processors*, Guy R. L. Sohie (published by Motorola Inc., 1991).

The result of the FFT operation is a list of frequencies and the voltage and phase associated with each such frequency. The result of the FFT is periodic, having a period that is equal to the sampling frequency. In the preferred embodiment of the present invention, the sampling frequency is 16 kHz. Therefore, the range of frequencies into which the time domain signal is mapped is equal to the sample frequency. When the power at a particular frequency is greater than a selected threshold amount, the DSP 508 determines that an object is present.

The DSP 508 determines the phase relationship of the channel 1 receive signal to the channel 2 receive signal. This can be determined by applying the formula, ARCTAN $[\{(B \times C)-(A \times D)\}/\{(A \times C)+(B \times D)\}]=\phi$(difference in phase), where A= the value of the real portion of the transformed channel 1 signal, B=the value of the imaginary portion of the transformed channel 1 signal, C=the real portion of the transformed channel 2 signal, and D=the value of the imaginary portion of the transformed channel 2 signal. Separate registers within the DSP 508 contain the real and imaginary values for the transformed channel 1 and channel 2 signals, making it a simple matter to implement the above formula to determine the phase relationship between the channel 1 and channel 2 signals at each frequency. Using a greater number of samples provides greater accuracy in determining the phase relationship. Using 4096 samples yields phase information with sufficient resolution to determine the range with an accuracy of 0.25 ft.

Figure 6:
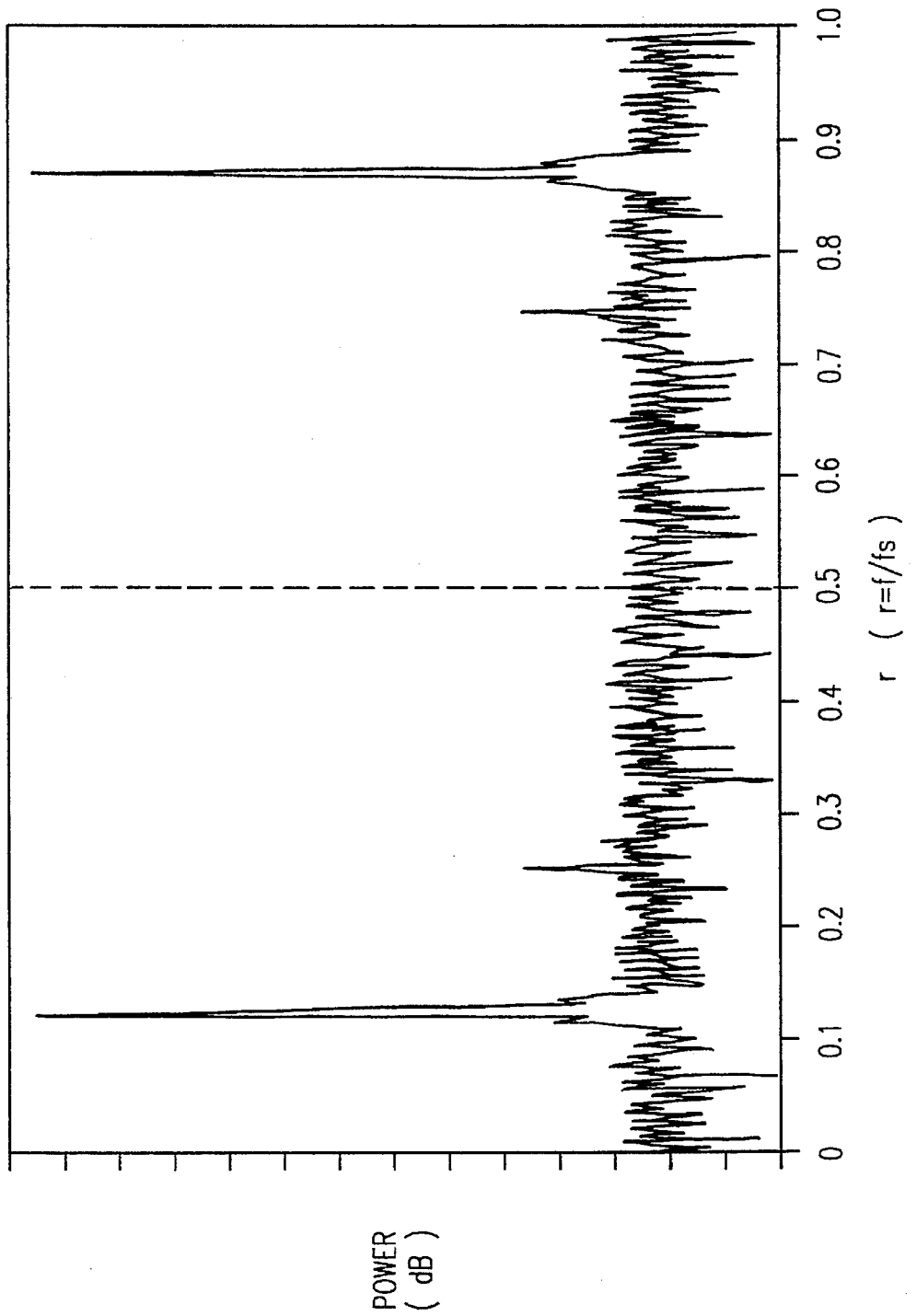
FIG. 6 is a graphic representation of the result of a FFT operation as performed by the DSP of the alternative embodiment shown in FIG. 4.

FIG. 6 is a graphic representation of the result of a typical FFT operation, wherein the receive signal was reflected off two targets, one of which is moving at a relative speed of 26 MPH with respect to the vehicle on which the system was mounted, the other moving at a relative speed of 52 MPH with respect to the vehicle on which the system was mounted. The hash marks along the X-axis are spaced in increments of $(0.1 \times f_S)$ Hertz, where $f_S$ is the sample frequency (in the preferred embodiment of the present invention, $f_S$=16 kHz). Power at each frequency is plotted on the Y-axis in decibels. No particular values are attached to each hash mark along the Y-axis, since the power is plotted as a relative value.

The DSP 508 transmits to the CPU 31 sets of digital data words associated with each identified target object. Each set consists of four digital data words associated with one target object. These four words indicate the Doppler frequency of the target, the magnitude of the signal reflected from the target at the channel 1 frequency, the magnitude of the signal reflected from the target at the channel 2 frequency, and the difference between the phase of the channel 1 and channel 2 signals.

The CPU 31 determines the range and relative speed of each target. The determination of the relative speed and distance is directly calculated by multiplying the frequency and phase difference by fixed factors, since the phase is linearly proportional to distance to (i.e., the range of) the target according to the formula, $R=C(\Theta_1-\Theta_2)/(4\pi(f_1-f_2))$, and frequency is linearly proportional to the relative speed of the target according to the formula, $f_d$=72 (Hz·hours/mile)×V (miles/hour). In the range formula, R is the range in feet, C is the speed of light in feet/second, $f_1$ is the frequency of the channel 1 signal, and $f_2$ is the frequency of the channel 2 signal. In the relative speed formula, $f_d$ is the frequency shift due to the Doppler phenomenon, and V is the relative velocity of the target with respect to the transceiver. However, in alternative embodiments, other means to map the frequency to a relative speed and the phase relationship to range may be used. For example, a table may be used to cross-reference frequency and phase to relative speed and distance, respectively. In the illustrated embodiment, targets which are moving rapidly with respect to the host vehicle are ignored to reduce distraction to the driver. This includes stationary objects. It is assumed that obstacles that are moving rapidly through one of the vehicle's blind spots will be seen by the driver before entering the blind spot, or will pass through the blind spot before the operator causes the vehicle to perform a maneuver which would present a danger due to the presence of the obstacle. In addition, a sensor which detects that the driver has activated a turn signal preferably causes the system to generate an audible alarm when an obstacle is detected in the blind spot, regardless of the relative speed of the obstacle.

The range of target objects is used by the CPU 31 to determine whether a target object is within a range which warrants warning the driver. In the preferred embodiment, the range is up to approximately 15". In one alternative embodiment, the CPU 31 sets a memory register (alternatively either internal or external to the CPU 31) whenever the object is within a range which poses a threat to the vehicle.

The range information can alternatively be determined using analog techniques which are well known in the art. For example, one such analog technique using a multi-frequency transmit signal is taught in U.S. Pat. No. 5,285,207 issued to Asbury et al. Using the range information, the present invention ignores large objects which are beyond a predetermined distance from the vehicle 7 even though they may produce reflections having equal energy to smaller objects which are much closer to the vehicle and thereby pose a greater threat to the vehicle. For example, the range information allows the CPU 31 to ignore a truck two lanes away from the vehicle even though the truck may reflect more energy than is reflected by a motorcycle which is only one lane from the vehicle. The range information also prevents reflections caused by water present on a surface of the host vehicle from triggering false warnings.

Figure 7:
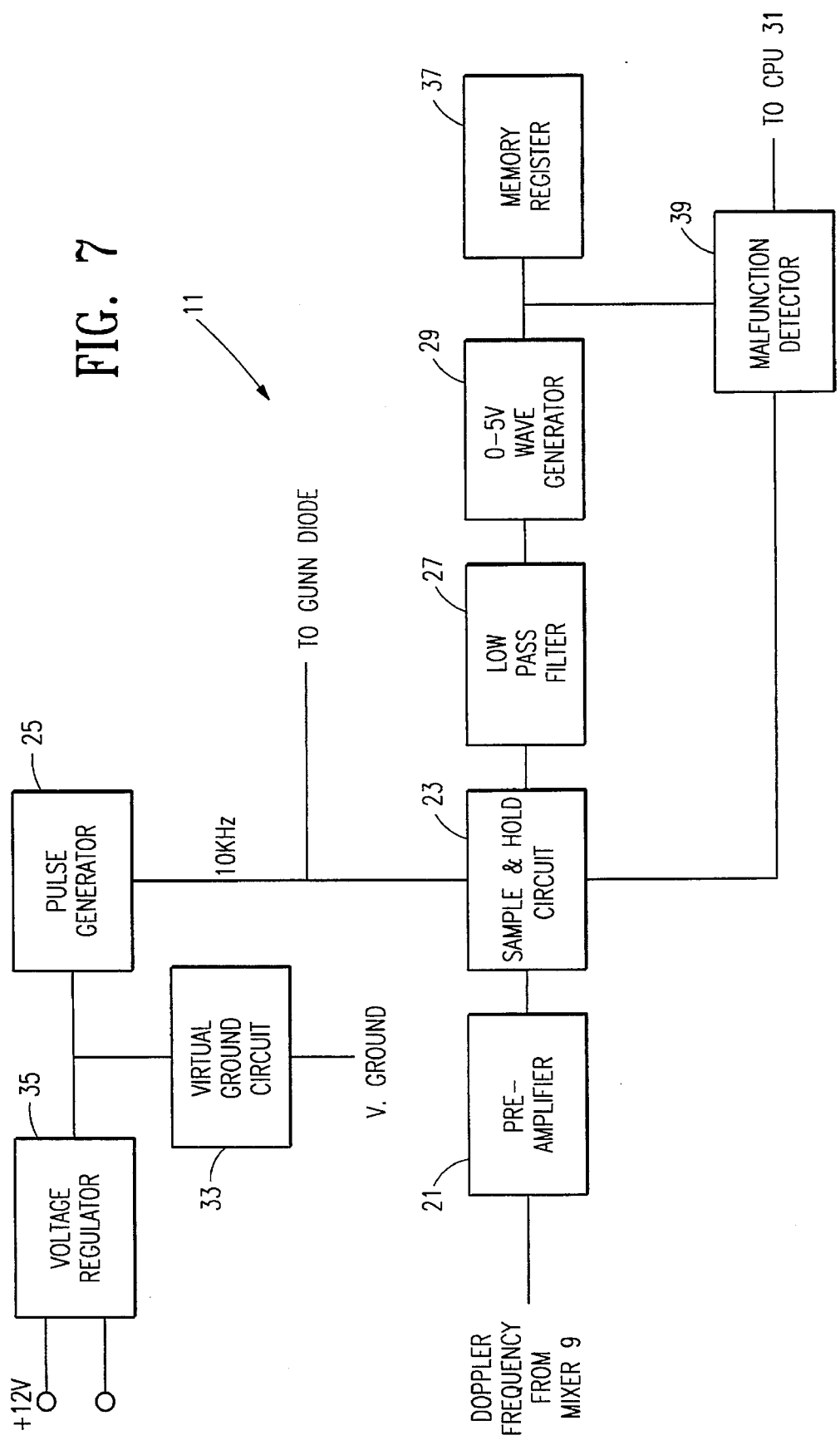
FIG. 7 is an alternative embodiment of the signal processor shown in FIG. 1.

Another alternative embodiment of the signal processor 11 is shown in FIG. 7. In the illustrated embodiment, an adjustable preamplifier (preamp) 21 receives the output from the mixer diode 9. The preamp 21 has a very low frequency response of approximately 0.5 Hz, thereby permitting very low frequencies to be amplified. By adjusting the gain of the preamp 21, the sensitivity of the system is set to permit only those obstacles which are in the immediate presence of the vehicle to be detected. Since the signal strength of the reflection drops by the square of the distance (i.e., $P=1/d^2$), proper adjustment of the preamp 21 is effective in limiting the range of the blind spot sensor. For example, experimentation has shown that a motorcycle will be detected in the lane adjacent to a vehicle equipped with the present invention at a distance of approximately 3 feet, while an automobile of average size will not be detected as being present if there is an empty lane between the automobile and the radar-equipped vehicle.

In the embodiment illustrated in FIG. 7, the output of the preamp 21 is coupled to a sample and hold circuit 23. The sample and hold circuit 23 samples the output of the preamp 21 at a rate and for a duration equal to the rate and duration at which the transmit signal is pulsed by the DRO 1 (i.e., for 10 μs at a rate of 10 kHz in the illustrated embodiment). The sampling is synchronized to the transmission of the transmit signal by applying the same synchronization signal from a pulse generator circuit 25 to both the DRO 1 and the sample and hold circuit 23. The synchronization signal causes the DRO 1 to generate the transmit signal when the synchronization signal is at a relatively high voltage level, and also gates the sample and hold circuit 23 to sample the output of the preamp 21 during the same period. Each time the sample and hold circuit 23 samples the output of the preamp 21, a voltage level is recorded. Thus, the output of the sample and hold circuit 23 is a series of voltage levels which increment or decrement every 100 μs. The voltage levels represent the phase difference (i.e., Doppler shift) between the transmit signal and the received signal applied to the mixer diode 9 during each sample period.

The output of the sample and hold circuit 23 is coupled to a low pass filter 27. The low pass filter 27 preferably has a 3 dB cutoff frequency of about 100 Hz. The low pass filter 27 serves three purposes: 1) to smooth the signal output by the sample and hold circuit 23 by removing high-frequency components of the output waveform; 2) to reduce noise, thus improving sensitivity without increasing RF power; and 3) to eliminate signals which represent objects moving rapidly relative to the vehicle, including stationary objects. Because the purpose of the present invention is to determine whether an obstacle which would otherwise go undetected by the operator is present in a blind spot of the vehicle, those obstacles which move rapidly through the blind spot are not of interest. It is assumed that obstacles that are moving rapidly through one of the vehicle's blind spots will be seen before entering the blind spot, or will pass through the blind spot before the operator causes the vehicle to perform a maneuver which would present a danger due to the presence of that obstacle.

The low pass filter 27 is coupled to a square wave generator 29 which generates a square wave signal that alternates between 0 volts and 5 volts. The frequency of the signal output by the square wave generator 29 is determined by the frequency of the input to the square wave generator 29 from the low pass filter 27. A square wave transition is output by the square wave generator 29 whenever an obstacle has been detected.

The square wave generator 29 preferably is a comparator circuit with hysteresis. The hysteresis provides noise immunity, prevents the comparator from oscillating, and limits range detection to a defined distance. Thus, when the input to the square wave generator 29 rises to cross a first relatively high threshold, the output of the square wave generator 29 transitions to a 5 volt level. When the input to the square wave generator 29 falls below a second relatively low threshold, the output of the square wave generator 29 transitions to a 0 volt level. The creation of a square wave output provides noise immunity and allows the output to be further processed by the CPU 31.

Because some of the circuitry used in the present invention operates more efficiently when power is supplied from a bipolar power supply (i.e., both positive and negative voltages), a virtual ground circuit 33 is included in the illustrated embodiment of the present invention. The virtual ground circuit 33 works in conjunction with a voltage regulator 35 to supply the power requirements of the illustrated embodiment of the present invention. Most automotive vehicles today include a 12 volt battery which powers the starter motor and the electrical system when the engine of the vehicle is not operating, and a voltage generator or alternator which recharges the battery and supplies current to the vehicle electrical system when the engine is operating. The voltage regulator 35 of the present invention receives power from the 12 volt vehicle power source and generates a stable 5 volt output. The 5 volt output of the voltage regulator 35 is applied to those components of the present invention which operate from a positive 5 volt source, and to the virtual ground circuit 33. The virtual ground circuit 33 creates a 2.5 volt output which acts as a virtual ground reference for those components within the present invention that require both positive and negative supply voltages. Thus, the 5 volt output of the voltage regulator 35 is 2.5 volts positive with respect to the virtual ground reference, and earth ground (0 volts) is 2.5 volts negative with respect to the virtual ground reference. Such virtual ground circuits are well known in the art.

A malfunction detector circuit 39 is coupled to both the sample and hold circuit 23 and the square wave generator 29. The malfunction detector circuit 39 generates an output that indicates whether the present invention is operating properly. When the present invention is operating properly, a direct current (DC) offset is present at the analog output of the sample and hold circuit 23. The DC offset is stripped from the analog output by capacitively coupling the analog output from the sample and hold circuit 23 to the low pass filter 27. However, the DC portion of the output of the sample and hold circuit 23 is present in the output that is coupled to the malfunction detector 39. In the illustrated embodiment, if the DC offset is not above a specified voltage, the malfunction detector 39 generates and sends a gate control signal to the square wave generator 29 which decouples the square wave generator 29 from output circuitry of the signal processing section 11. A voltage divider circuit coupled to the signal processing section 11 output causes the output of the signal processing section 11 to be 2.5 volts. Because, under normal conditions, the square wave generator 29 outputs only 0 volts or 5 volts, the presence of a 2.5 volt output from the square wave generator 29 indicates a problem.

The output of the square wave generator 29 is coupled to a dual edge-triggered memory register (flip-flop) 37, which is used to establish a "persistence period", as described below. A "persistence period" is preferably defined as the amount of time that it takes the vehicle upon which the radar system in mounted to travel 15 feet. When an obstacle is first detected, as determined by a transition at the output of the square wave generator 29, the CPU 31 waits the persistence period before responding to additional transitions. During the persistence period, no warnings are sent to the driver indicators. After the end of the persistence period, a warning is sent after each such transition if the transition occurs either within one second after the end of the last persistence period or two seconds after a prior warning was sent. Otherwise, a new persistence period cycle begins.

In one embodiment of the present invention which uses any of the techniques described herein, if it is determined that there is an obstacle which persists in the blind spot, a indication is presented to the operator of the vehicle. In the preferred embodiment of the present invention, three types of indications are used. If the vehicle's turn signal becomes active (as detected by a position sensor coupled to an input of the CPU 31), and an obstacle is detected in the blind spot, an audible alarm sounds (e.g., emits an audible tone, whistle, or buzz) and a red visual indicator illuminates. If the turn signal is not active and an obstacle is detected in the blind spot, the audible alarm is not activated, but the red visual indicator illuminates. If no obstacle is detected, a yellow visual indicator illuminates and the red indicator is inactive (illumination of the yellow indicator signifies that the blind spot sensor and circuit are active.)

In an alternative embodiment of the present invention, sensors to detect the steering wheel position and/or the position of the turn signal are used to provide an indication that the operator is attempting to turn or change lanes. Other sensors may also be used to aid in the determination as to when the operator is attempting to cause the vehicle to enter a blind spot region. The system can be configured, if desired, to detect turning indicated by the position of the turn signal and/or by sensing the position and movement of the steering wheel, and to activate the audible alarm only if a turn is indicated in the direction of a blind spot in which an obstacle is present.

Figure 8A:
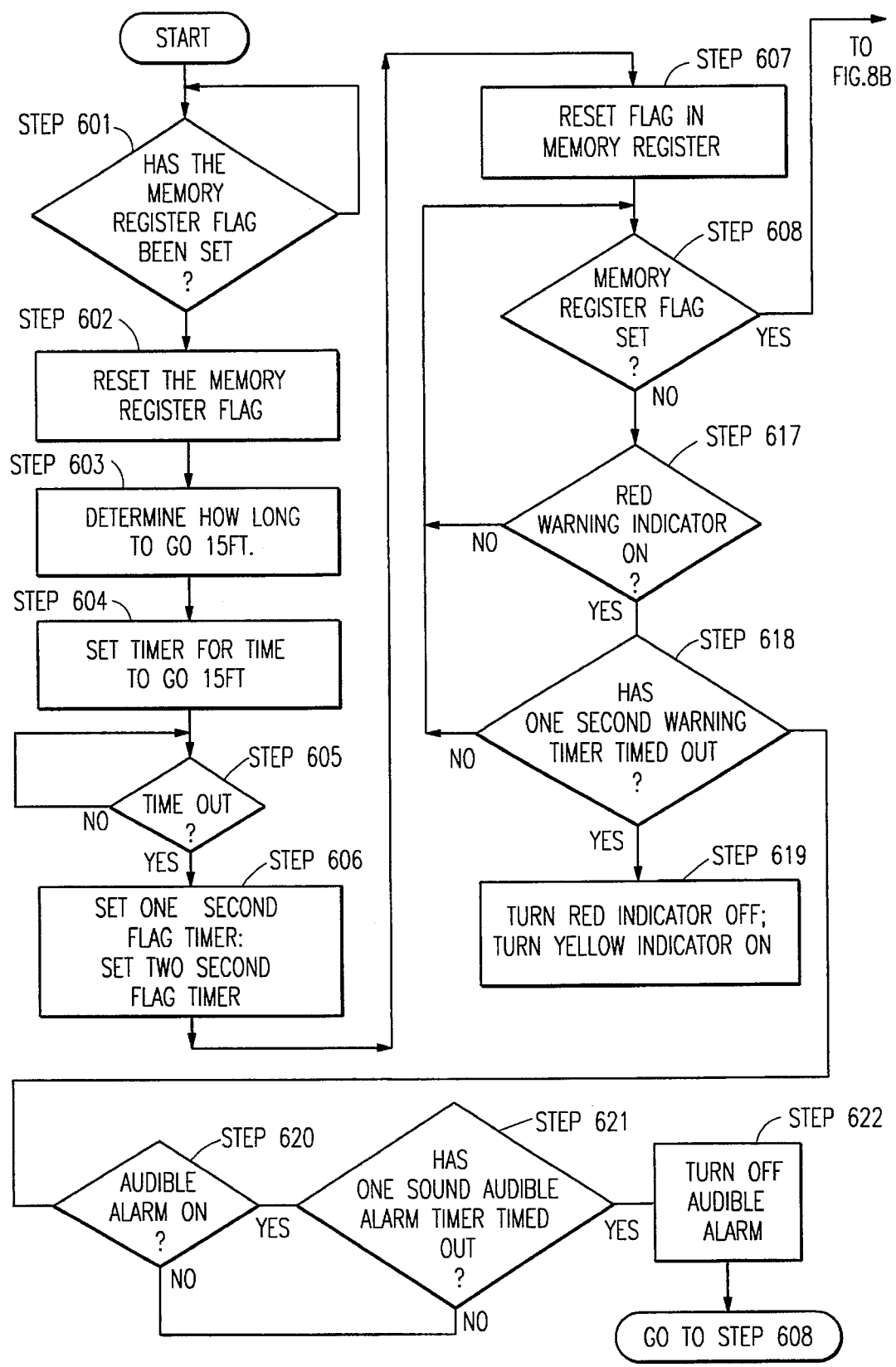
FIGS. 8a and 8b are flow charts of the procedure followed by the preferred embodiment of the present invention upon detection of an obstacle.
Figure 8B:
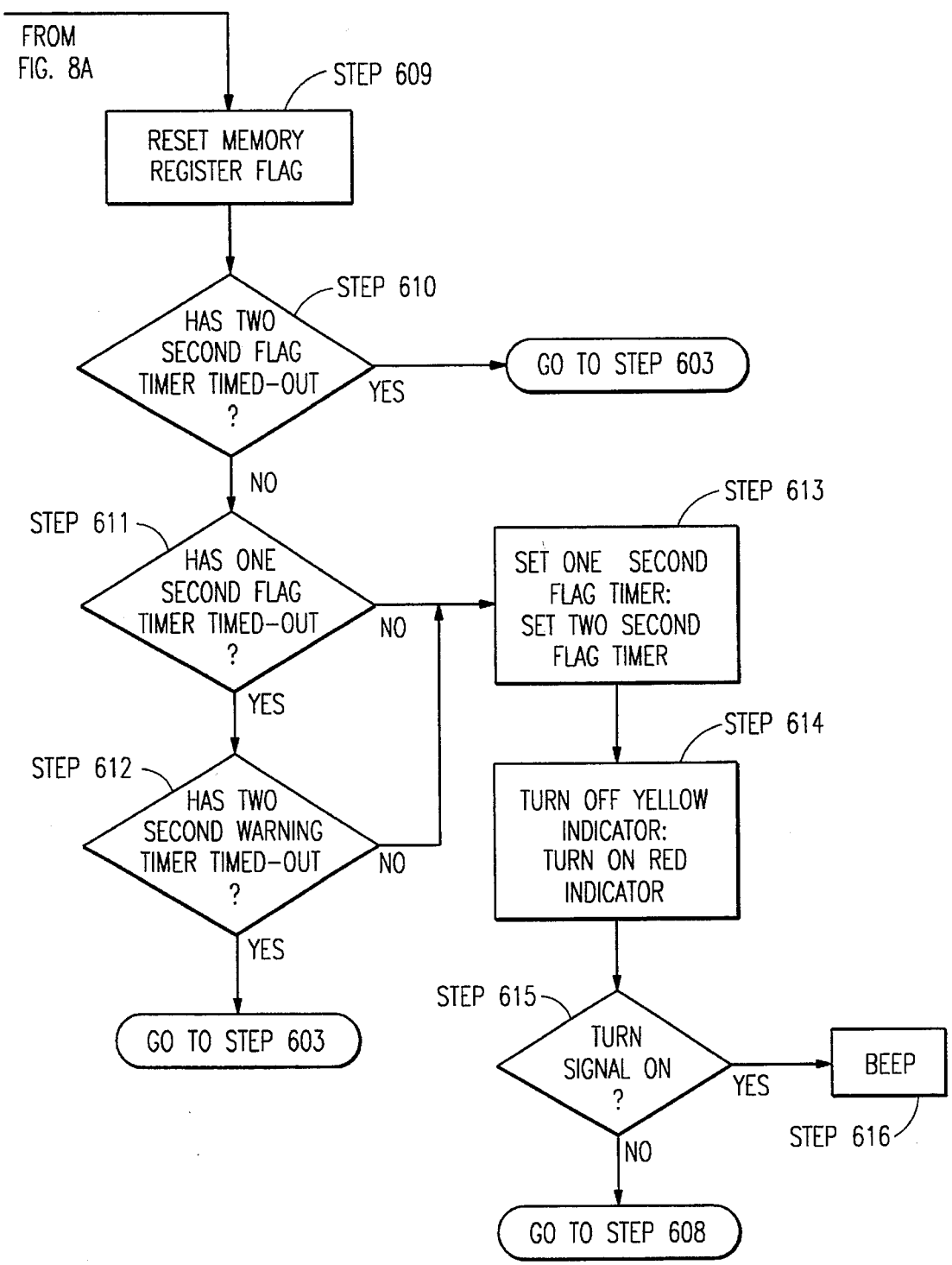

FIGS. 8a and 8b are flow charts of the procedure followed by the CPU 31 for determining whether to warn the vehicle's operator of the presence of an obstacle in a monitored blind spot. In the preferred embodiment, whenever an object is within a range which poses a threat to the vehicle, a flag within a register, such as the register 37, is set. The register can optionally be internal to the CPU 31, which can be set by the CPU 31 when objects are within a specified range. The CPU 31 polls the register at regular intervals to determine whether the register has been set (STEP 601). In an alternative embodiment of the present invention, the CPU 31 is interrupted when the flag within the register 37 is set. Once the CPU 31 detects that the flag within the register has been set, the CPU 31 resets the flag (STEP 602) and ceases polling the register. The CPU 31 is preferably coupled to a speedometer which measures the ground speed of the vehicle. The CPU 31 uses the vehicle speed to calculate how long it will take the vehicle to travel 15 feet (i.e., the persistence period) (STEP 603), and sets a timer to "time-out" at the end of the calculated amount of time (STEP 604). Once the timer times out (STEP 605), the CPU 31 sets a one second and a two second flag timer (STEP 606), and resets the flag in register to ensure that any new transitions that may have occurred during the persistence period are cleared (STEP 607).

In an alternative embodiment of the present invention, a timer is used to indicate the amount of time elapsed after the flag in the register is reset. Thus, the same timer which is used to determine when the persistence period has elapsed is reset and can be read at any time to determine the amount of time elapsed since the flag in the register is reset. The timers of the preferred embodiment of the present invention are integrated into the CPU 31. However, one skilled in the art will appreciate that one or more of the timers may be implemented in external circuitry.

In the illustrated embodiment of the invention, the CPU 31 once again begins polling the flag within the register after the persistence timer has timed out (STEP 608). By suspending the polling of the register for the persistence period, and resetting the register at the end thereof, the system effectively ignores transitions at the output of the square wave generator 29 (or alternatively, the output of the range detector shown in FIG. 2a) caused by reflections of the RF transmit signal off stationary obstacles, such as parked cars and road signs, which are present in the blind spot for less than the persistence period.

The CPU 31 checks whether a warning is presently being displayed (i.e., in the preferred embodiment of the present invention, whether the red indicator is illuminated) (STEP 617) while waiting for the flag in the register to be set. If a warning is presently being displayed, the CPU 31 determines how long it has been since the warning was last activated. If the warning has been on display for more than one second without being reactivated (STEP 618), the CPU 31 causes the warning to cease being displayed (STEP 619). The CPU 31 also determines whether an audible alarm has been sounding for more than one second without being reactivated (STEP 621), and causes the audible alarm to cease if reactivation of the alarm has not occurred in the last one second (STEP 622).

If the CPU 31 determines that the flag in the register is set (STEP 608), the CPU 31 resets the flag (STEP 609) and checks how long it has been since the persistence timer timed-out (STEP 610). If more than two seconds have passed since the persistence timer timed-out, the process returns to STEP 603 and suspends the polling of the register once again. Thus, if an obstacle reflects the RF transmit signal back to the antenna 7, causing the DSP 508 to detect a target object which causes the flag in the memory register to be set, but no further reflections are detected by the DSP 508 for over two seconds, the system behaves as if the next reflection is unrelated to the last reflection, i.e., polling is suspended to ensure that the obstacle that caused the reflection persists for more than the time required to travel 15 feet. Similarly, in the alternative embodiment shown in FIG. 7, if an obstacle reflects the RF transmit signal back to the antenna 7, causing the output of the square wave generator 29 to transition, but no further reflections are detected for over two seconds, the system behaves as if the next transition of the square wave generator 29 is unrelated to the last transition.

However, if the reflection has occurred within two seconds of the time-out of the persistence timer (i.e., the two-second persistence timer has not timed-out), then the CPU 31 checks whether one second has elapsed between the end of the persistence period and the latest reflection (STEP 611). If more than one second has elapsed, then the CPU 31 checks whether more than 2 seconds have elapsed since the last warning has been reactivated (STEP 612). If more than two seconds have elapsed, then the system returns to STEP 603 and suspends polling of the flag in the register for the duration of a newly calculated persistence period. Otherwise, a one second warning timer and a two second warning timer are set (STEP 613), and the warning is reactivated (i.e., in the preferred embodiment of the present invention, the yellow indicator is turned off and the red indicator is turned on) (STEP 614). It should be understood that, as with the flag timers of step 606, the warning timers may be implemented as a single timer and may be either discrete timers or integrated into the CPU 31.

In the preferred embodiment of the present invention, the CPU 31 determines whether the vehicle turn signal is active (STEP 615). If so, an audible alarm is activated to indicate that an obstacle is present in the blind spot and that turning the vehicle may be hazardous (STEP 616). After reactivating the warning and resetting the warning timer, the system returns to STEP 608 to await the next setting of the flag in the register.

By determining whether a warning has been activated within the last two seconds, and if so, then extending the period before which the system resets the persistence timer, an obstacle in the blind spot which is moving at a very slow speed relative to the vehicle is not filtered out of the system due to the long duration between transitions of the square wave generator 29 output. For example, an obstacle in the blind spot moving at a relative speed that produces a Doppler frequency of less than 0.5 Hz generates transitions at the output of the square wave generator 29 at twice the Doppler frequency, i.e., less than 1 Hz. Therefore, the time between transitions is greater than 1 second. Increasing the amount of time allowed between the time-out of the persistence timer in STEP 605 and the next occurrence of a transition (as determined by detecting that the flag in the register has been set) increases the low frequency response of the system. If it is already determined that an obstacle was very recently present (i.e., the warning timer has not yet timed-out), then the possibility that an obstacle of interest caused the transition is much greater.

Figure 9:
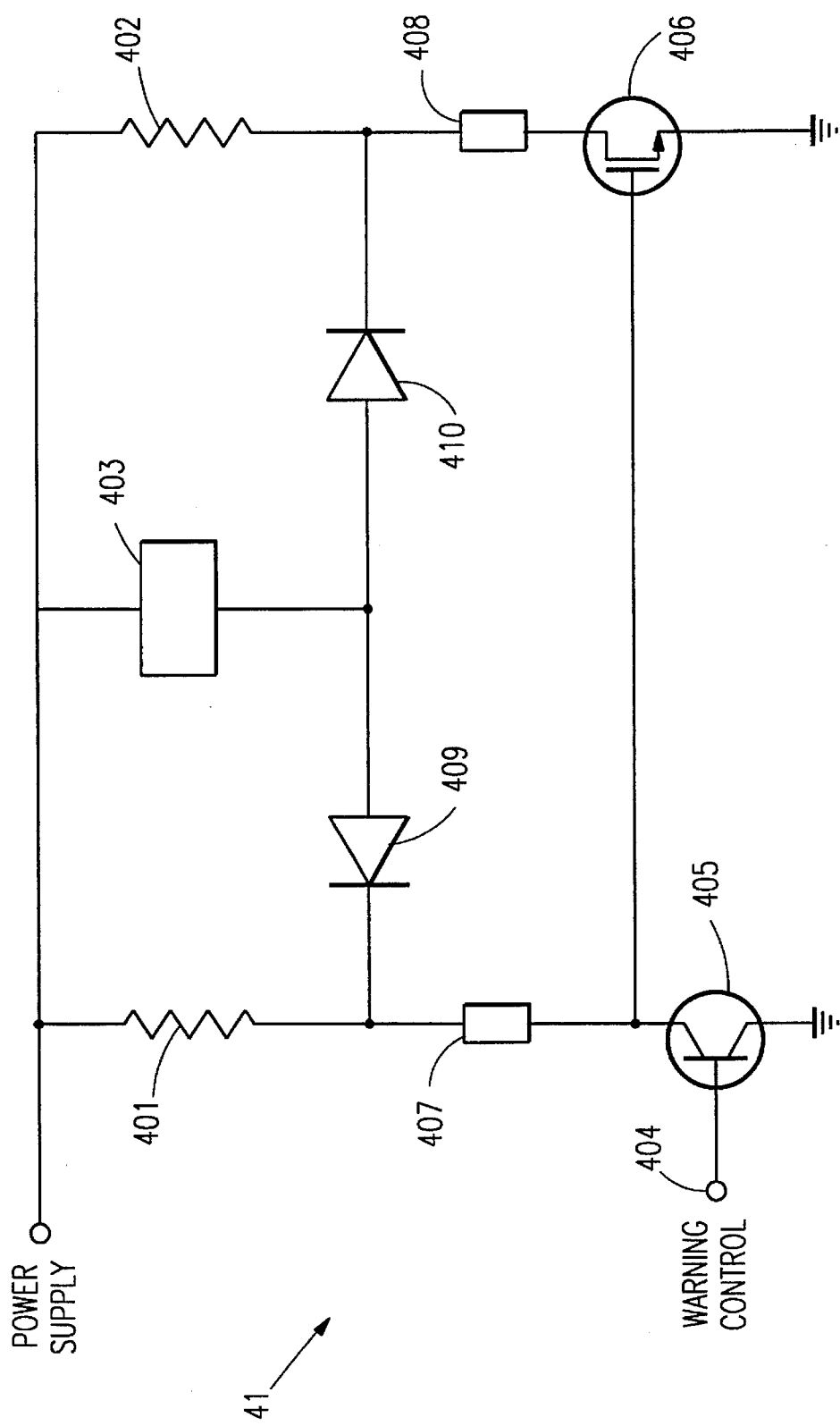
FIG. 9 is a simplified schematic of the indicator circuit of the preferred embodiment of the present invention.

FIG. 9 is a simplified schematic of a preferred indicator circuit 41 for controlling the illumination of two warning indicators 407, 408, one of which would be yellow and the other red. A power supply is coupled to two resistors 401, 402 and a photo switch 403. A warning control input 404 coupled to a control output of the CPU 31 controls the conductivity of a bipolar transistor 405, which in turn controls the conductivity of a field effect transistor (FET) 406. By controlling the bipolar transistor 405 and the FET 406, the warning control input 404 controls the current flow through the two warning indicators 407, 408. The photo switch 403 is capable of bypassing the current limiting resistors 401 and 402, and thus increasing the luminance of each of the warning indicators 407, 408. The photo switch 403 is turned on (i.e., conducts current) when the ambient light is greater than a predetermined threshold amount. Therefore, the luminance is automatically controlled as a function of the ambient light, such that the warning indicators 407, 408 are visible in full sunlight, and are dimmed for nighttime conditions. Diodes 409, 410 divide the current that passes through the photo switch 403 when the photo switch is conducting, while isolating the current that flows through the resistors 401, 402 and indicators 407, 408 when the photo switch is not conducting.

In the preferred embodiment of the present invention, the visual warning indicators 407, 408 are very high luminance light emitting diodes (LEDs) placed on or in close proximity to a mirror on the same side of the vehicle as the blind spot sensor, such that when the operator looks in the mirror the warning indicators 407, 408 are prominent. Having the warning indicators 407, 408 affixed to an existing mirror allows it to be seen by a normal, practiced motion of the driver's head. However, the operator is not distracted or disturbed by the frequent indications of obstacles which may occur under normal traffic conditions, and which are of little or no interest to the operator unless a maneuver is planned which would cause the vehicle to come into contact with the obstacle.

The present invention thus provides a simple, inexpensive, and complete solution to the problem of detecting hazardous obstacles in the blind spots of a vehicle. In addition, because the system generates and senses its own electromagnetic waves, the present invention works at night and under most adverse weather conditions. Reflected signals attributable to objects which are of no interest, such as stationary objects, objects which are beyond a dangerous range from the vehicle, or which do not persist a minimum amount of time, are ignored. Only persistent obstacles that are traveling at approximately the same speed and direction as the vehicle and are within range of the vehicle are considered to be of interest, and will cause the blind spot sensor to generate an indication that an obstacle is present in the blind spot. In the preferred embodiment, the indicators give a first, non-obtrusive indication to signify that the blind spot sensor is active, a second, somewhat obtrusive indication to signify that a persistent obstacle is present in the blind spot, and a third, more obtrusive indication to signify that a persistent obstacle is present in the blind spot if the driver has activated the turn indicator.

While a number of embodiments of the present invention have been described, it will be understood that various modifications may be made without departing from the spirit and scope of the invention. For example, the transceiver may transmit and receive ultrasonic or infrared radiation. Also, the RF transmit signal may be a pseudo-pulse signal in which the DRO 9 is not turned completely off, but rather alternates between two discrete power levels. Still further, a wide variety of mechanisms or methods can be used for warning the vehicle operator of the presence of an obstacle, such as bells, physical vibrations, visual indications placed on the dashboard or windshield, and/or use of a mirror incorporating a material (e.g., lead lanthanum zirconate titanate, or PLZT) which changes color (i.e., turns red) or otherwise changes optical properties when the smart blind spot sensor detects an obstacle in the blind spot. Moreover, the smart blind spot sensor can use multiple Doppler detection modules to provide coverage of multiple blind spots. In such a configuration, a single CPU 31 can be used to poll and control all of the modules, thus reducing the cost of such a system by time-sharing the CPU 31 between the multiple modules. Still further, the values disclosed above for the persistence periods, time-out periods, duty-cycle, etc., may be varied as desired, and are not limited to the particular values disclosed.

Accordingly, it is to be understood that the invention is not to be limited by the specific illustrated embodiment, but only by the scope of the appended claims.

We claim:

1. A blind spot sensor for detecting the presence and range of an object in at least one blind spot region of a vehicle controlled by and operator, including:
    a. object detection means for detecting an object comprising at least one transmit means for transmitting a signal directed toward at least one blind spot region, and a receiving means for receiving reflections of the transmit signal;
    b. signal processing means, coupled to the object detection means, for processing the received reflections to detect if an object is present in at least one blind spot region, and to detect if the object is within a pre-determined range, but at least a predetermined minimum distance from the vehicle;
    c. processing means, coupled to the signal processing means, for determining if a detected object poses a hazard to the vehicle; and
    d. indicator means, coupled to the processing means, for indicating to the vehicle operator at least the presence of a detected object which poses a hazard to the vehicle.

2. The blind spot sensor of claim 1, wherein the object detection means is a radar transceiver.

3. The blind spot sensor of claim 1, wherein received reflections from a detected obstacle must persist a selected duration of time to be determined to pose a threat to the vehicle.

4. The blind spot sensor of claim 3, wherein the selected duration of time varies with the speed of the vehicle.

5. The blind spot sensor of claim 1, wherein the indicator means generates a first indication to signify that the system is active.

6. The blind spot sensor of claim 1, wherein the indicator means generates a first indication to signify that a detected object is present in at least one blind spot region of the vehicle and is within the pre-determined, but at least a predetermined minimum distance from the vehicle.

7. The blind spot sensor of claim 1, wherein the vehicle includes a turn signal, further including sensor means for detecting activation of the turn signal, the sensor means being coupled to the processing means, and wherein the indicator means generates a first indication to signify that a hazardous object is present in at least one blind spot region of the vehicle and that the turn signal has been activated.

8. The blind spot sensor of claim 7, wherein the indicator means includes an audible alarm for generating the first indication.

9. The blind spot sensor of claim 1, wherein the indicator means includes a first visual indicator to signify that the system is active, and a second visual indicator to signify that a hazardous object is present in the blind spot region of the vehicle and is within the pre-determined range, but at least a predetermined minimum distance from the vehicle.

10. The blind spot sensor of claim 9, wherein the vehicle includes at least one automotive mirror, and the first and second visual indicators are mounted on or in close proximity to at least one such automotive mirror.

11. The blind spot sensor of claim 9, wherein the vehicle includes a turn signal, further including sensor means for detecting activation of the turn signal, the sensor means being coupled to the processing means, wherein the indicator means includes an audible indicator to signify that a hazardous object is present in at least one blind spot region of the vehicle, that the object is within the pre-determined range of the vehicle, and that the turn signal has been activated.

12. The blind spot sensor of claim 2, wherein the radar transceiver is a pulse Doppler radar transceiver.

13. The blind spot sensor of claim 2, wherein the radar transceiver is mounted on the right side of the vehicle.

14. The blind spot sensor of claim 2, wherein the radar transceiver is mounted on the rear of the vehicle.

15. A blind spot sensing system for detecting the presence and range of an object in a blind spot region of an operator-controlled vehicle, including:
    a) microwave transceiver means, mounted on the vehicle, for transmitting a multi-frequency transmit signal, receiving reflections of the transmit signal, and comparing the frequencies of the transmit signal to the frequencies of the received reflections to produce a multi-frequency difference signal;
    b) signal processing means, coupled to the microwave transceiver means, for amplifying and filtering the multi-frequency difference signal, wherein the signal processing means time demultiplexes the amplified difference signal to produce a plurality of difference signals, and wherein the signal processing means includes a comparison means for calculating the phase difference between the plurality of difference signals, and wherein the signal processing means determines whether an object is within a pre-determined range of but a minimum distance from, the vehicle based upon the calculated phase difference;
    c) processing means, coupled to the signal processing means, for determining if the vehicle's operator should be warned of the presence of the object; and
    d) indicator means, coupled to the processing means, for indicating to the operator the presence of the object.

16. A blind spot sensor for determining if an object is present in at least one blind spot region of a vehicle controlled by an operator and within a range which poses a threat to the vehicle, including:
    a) a transceiver means for transmitting a multi-frequency transmit signal directed toward at least one blind spot region, and for receiving reflections of the multi-frequency transmit signal;
    b) signal processing means, coupled to the transceiver means, for processing the received reflections to detect if an object is present in at least one blind spot region, and to determine if the object is within a pre-determined range from the vehicle, wherein the signal processing means includes:
        i) a preamplifier, coupled to the transceiver means, for amplifying the received reflections,
        ii) a demodulator, coupled to the preamplifier, for time demultiplexing the amplified received reflections into a plurality of receive channel signals, iii) a sampling circuit, coupled to the demodulator, for converting the receive channel signals into smooth receive channel signals, iv) a first processing means, coupled to the sampling circuit, for comparing the phase differential between the smooth receive channel signals, and for calculating the range of a detected object based upon the comparison, wherein the first processing means generates an output signal indicative of whether the object is within a predetermined range of but a minimum distance from, the vehicle;

c) second processing means, coupled to the signal processing means, for determining if a detected object poses a hazard to the vehicle; and d) indicator means, coupled to the second processing means, for indicating to the vehicle operator at least the presence of a detected object which poses a hazard to the vehicle.

17. The blind spot sensor of claim 16, wherein the first processing means compares the phase differential between the smooth receive channel signals by performing an exclusive-or operation on the plurality of smooth receive channel signals to produce an exclusive-or output signal, and by measuring the duty cycle of the exclusive-or output signal.

18. The blind spot sensor of claim 17, wherein the first processing means determines the range that an object is from the vehicle by averaging the calculated phase differential over a pre-determined number of phase difference measurements.

19. A blind spot sensor for determining if an object is present in at least one blind spot region of a vehicle controlled by an operator and is within a range which poses a threat to the vehicle, including:

a) a transceiver means for transmitting a multi-frequency transmit signal directed toward at least one blind spot region, and receiving reflections of the multi-frequency transmit signal;

b) a mixing means, coupled to the transceiver means, for comparing the frequencies of the transmit signal with the frequencies of the received reflections, and for generating a multi-frequency Doppler receive signal indicative of the comparison;

c) signal processing means, coupled to the mixing means, for processing the Doppler receive signal to determine if an object is present in at least one blind spot region, and to determine if the object is within a pre-determined range from the vehicle, wherein the signal processing means includes:

i) a preamplifier, coupled to the mixing means, for amplifying the multi-frequency Doppler receive signal, ii) a sampling circuit, coupled to the preamplifier, for time demultiplexing the multi-frequency Doppler receive signal into a plurality of receive channel signals, wherein the sampling circuit produces a different receive channel signal for each frequency of the transmit signal, iii) a plurality of low-pass filters coupled to the sampling circuit, wherein the filters produce a filtered channel signal for each receive channel signal, iv) an analog to digital converter, coupled to the plurality of low-pass filters, which convert the filtered channel signals to digital receive channel signals, and v) a digital signal processor, coupled to the analog to digital converter, for comparing the phase difference between the digital receive channel signals, and for calculating the range of a detected object based upon the phase comparison, wherein the digital signal processor generates an output signal indicative of the range that the object is from the vehicle;

d) processing means, coupled to the digital signal processor, for determining if a detected object poses a hazard to the vehicle; and e) indicator means, coupled to the processing means, for indicating to the vehicle operator at least the presence of a detected object which poses a hazard to the vehicle.

20. The blind spot sensor of claim 19, wherein the digital signal processor compares the phase difference between the digital receive channel signals by performing a fast Fourier transform operation on the digital receive channel signals to produce transformed channel signals, and by applying the following formula:

$$\text{ARCTAN}[\{(B \times C) - (A \times C)\}/\{(A \times C) + (B \times D)\}] = \phi(\text{difference in phase}),$$

where

A=the value of the real portion of the transformed channel 1 signal,

B=the value of the imaginary portion of the transformed channel 1 signal,

C=the real portion of the transformed channel 2 signal, and

D=the value of the imaginary portion of the transformed channel 2 signal.

21. A blind spot sensor for determining if an object is present in at least one blind spot region of a vehicle controlled by an operator and within a range which poses a threat to the vehicle, including:

a) a transceiver which transmits a signal directed toward at least one blind spot region, and which receives reflections of the transmit signal;

b) a signal processor, coupled to the transceiver, wherein the signal processor processes the received reflections to detect if an object is present in at least one blind spot region, and wherein the signal processor determines if the object is within a pre-determined range from the vehicle, and wherein the signal processor includes:

i) a preamplifier, coupled to the transceiver, wherein the preamplifier amplifies the received reflections, ii) a demodulator, coupled to the preamplifier, wherein the demodulator time demultiplexes the amplified received reflections into a plurality of receive channel signals, iii) a sampling circuit, coupled to the demodulator, which converts the receive channel signals into smooth receive channel signals, iv) a first processor, coupled to the sampling circuit, wherein the first processor compares the phase differential between the smooth receive channel signals, and wherein the first processor calculates the range of a detected object based upon the comparison, and wherein the first processor generates an output signal indicative of whether the object is within a predetermined range of the vehicle;

c) a second processor, coupled to the signal processor, wherein the second processor determines if a detected object poses a hazard to the vehicle; and d) an indicator, coupled to the second processor, wherein the indicator generates an indication to the vehicle operator of at least the presence of a detected object which poses a hazard to the vehicle.

22. A blind spot sensor for determining if an object is present in at least one blind spot region of a vehicle controlled by an operator and is within a range which poses a threat to the vehicle, including:

a) a transceiver which transmits a signal directed toward at least one blind spot region, and receives reflections of the transmitted signal;

b) a mixer, coupled to the transceiver, wherein the mixer compares the frequencies of the transmitted signal with the frequencies of the received reflections, and wherein the mixer generates a multi-frequency Doppler receive signal indicative of the comparison;

c) a signal processor, coupled to the mixer, wherein the signal processor processes the Doppler receive signal to determine if an object is present in at least one blind spot region, and wherein the signal processor processes the Doppler receive signal to determine if the object is within a pre-determined range from the vehicle, and wherein the signal processor includes:

i) a preamplifier, coupled to the mixer, wherein the preamplifier amplifies the multi-frequency Doppler receive signal, ii) a sampling circuit, coupled to the preamplifier, wherein the sampling circuit time demultiplexes the multi-frequency Doppler receive signal into a plurality of receive channel signals, and wherein the sampling circuit produces a different receive channel signal for each frequency of the transmitted signal, iii) a plurality of low-pass filters coupled to the sampling circuit, wherein the filters produce a filtered channel signal for each receive channel signal, iv) an analog to digital converter, coupled to the plurality of low-pass filters, wherein the analog to digital converter converts the filtered channel signals to digital receive channel signals, and v) a digital signal processor, coupled to the analog to digital converter, wherein the digital signal processor compares the phase difference between the digital receive channel signals, and wherein the digital signal processor calculates the range of a detected object based upon the phase comparison, and wherein the digital signal processor generates an output signal indicative of the range that the object is from the vehicle;

d) a processor, coupled to the digital signal processor, for determining if a detected object poses a hazard to the vehicle; and e) an indicator, coupled to the processor, wherein the indicator generates an indication to the vehicle operator of at least the presence of a detected object which poses a hazard to the vehicle.

23. A method of concurrently determining if an object is present in at least one blind spot region of a vehicle controlled by an operator and determining whether an object is within a range which poses a threat to the vehicle, including:

a) transceiving a signal by transmitting a signal directed toward at least one blind spot region, and receiving reflections of the transmitted signal;

b) processing the received reflections to detect if an object is present in at least one blind spot region, and to determine if the object is within a pre-determined range from the vehicle, wherein the processing step includes the following steps:

i) amplifying the received reflections, ii) time demultiplexing the amplified received reflections into a plurality of receive channel signals, iii) converting the receive channel signals into smooth receive channel signals, iv) comparing the phase differential between the smooth receive channel signals, and calculating the range of a detected object based upon the comparison, and v) generates an output signal indicative of whether the object is within a predetermined range of but a minimum distance from, the vehicle;

c) determining if a detected object poses a hazard to the vehicle; and d) indicating to the vehicle operator at least the presence of a detected object which poses a hazard to the vehicle.

24. A system for detecting the presence of targets moving at slow speeds relative to the vehicle upon which the system is mounted and adjacent to, and on at least one side of, the vehicle upon which the system is mounted, including:

a. a transceiver for emitting signals along side a vehicle upon which the system is mounted and for receiving reflections of the emitted signals;

b. a Doppler circuit, coupled to the transceiver, for generating a Doppler signal having a frequency equal to the difference between the emitted signal and the received reflections;

c. a signal processing section including:

an amplifier, coupled to the Doppler circuit;

ii. square wave generator coupled to the sample and hold circuit for generating a square wave output having a frequency equal to the signal output from the sample and hold circuit;

iii. signal processing means, coupled to the square wave generator, for processing the output from the square wave generator to detect if an object is present in at least one blind spot region, and to detect if the object is at least a first predetermined distance away, but not more than a second predetermined distance;

iv. a persistence period circuit, coupled to the amplifier, for generating an output equivalent to the output of the amplifier when an object is present for a predefined minimum persistence period;

d. an indicator circuit, coupled to the persistence period circuit, for receiving the output of the persistence circuit and indicating to an operator of the vehicle on which the system is mounted, the presence of an object which is detected for a period which is longer than the persistence period, and that the object is within the range defined by the first and second predetermined distances.

25. A system for detecting the presence of targets moving at slow speeds relative to the vehicle upon which the system is mounted and adjacent to, and on at least one side of, the vehicle upon which the system is mounted, including:

a. a transceiver for emitting signals along side a vehicle upon which the system is mounted and for receiving reflections of the emitted signals;

b. a Doppler circuit, coupled to the transceiver, for generating a Doppler signal having a frequency equal to the difference between the emitted signal and the received reflections;

c. a signal processing section including:

an amplifier, coupled to the Doppler circuit, for amplifying the Doppler signal;

ii. a ranging circuit for determining the range of objects from which the emitted signal has reflected and indicating which signals are associated with objects that are at a distance that is greater than a first predetermined distance and less than a second predetermined distance, the second predetermined distance being greater than the first predetermined distance;

iii. a sample and hold circuit, coupled to the amplifier, for sampling the output of the amplifier during periods concurrent with the emission of the emitted signals and generating a signal having a voltage level that is proportional to the phase difference between the emitted signal and received reflections;

iv. square wave generator coupled to the sample and hold circuit, for generating a square wave output having a frequency equal to the sampled signal;

v. malfunction detector circuit, coupled to the output of the square wave generator and the output of the sample and hold circuit, for sensing the level of the direct current offset of the signal generated by the sample and hold circuit, to determine when the system is operating within specified limits, and indicating a malfunction in the detection system when the system is not operating within the specified limits;

d. an indicator circuit, coupled to the square wave generator, for receiving the output of the square wave generator and indicating to an operator of the vehicle on which the system is mounted, the presence of an object which is detected to be within the range determined by the first and second predetermined distances.

26. The system of claim 25, wherein the malfunction detector circuit is coupled to the indicator circuit for indicating to an operator of the vehicle on which the system is mounted when the system is operating within specified limits.

27. The system of claim 25, wherein:
a. the indicator circuit is coupled to at least one automotive turn signal;
b. the indication of the presence of an object is by means of a visual indicator; and
c. an audible alarm to the operator, in addition to the visual indication, is presented to the operator when an object is detected on the side of the vehicle to which the turn signal signals a turn.

28. The system of claim 25, wherein the low pass filter has a 3 decibel cutoff at approximately 100 Hertz.

29. A system for detecting the presence of objects moving at relatively slow speeds adjacent to, and on at least one side of, a vehicle upon which the system is mounted, including:
a. a transceiver for emitting signals along side a vehicle upon which the system is mounted and for receiving reflections of the emitted signals;
b. a Doppler circuit, coupled to the transceiver, for generating a Doppler signal having a frequency equal to the difference between the transmitted signal and the received signal;

c. signal processing section for:
   i. sampling the Doppler signal during periods concurrent with the emission of the emitted signals and generating a voltage level proportional to the phase difference between the emitted and received signals;
   ii. determining the range of objects which have reflected the emitted signals;
   iii. disregarding targets that are determined to be less than a minimum distance away from the system;
   iv. removing high frequency components and signals which represent objects moving rapidly relative to the vehicle upon which the system is mounted from the sampled Doppler signal;
   v. sensing the level of the direct current offset of the signal sampled Doppler signal to determine when the system is operating within specified limits;
d. an indicator circuit, coupled to the signal processor, for indicating to the operator that an object is detected which is more than minimum distance away from the system, and which is moving relatively slowly.

30. A system for detecting the presence of targets moving at slow speeds relative to the vehicle upon which the system is mounted and adjacent to, and on at least one side of, the vehicle upon which the system is mounted, including:
a. a transceiver for emitting signals along side a vehicle upon which the system is mounted and for receiving reflections of the emitted signals;
b. a Doppler circuit, coupled to the transceiver, for generating a Doppler signal having a frequency equal to the difference between the emitted signal and the received reflections;
c. a signal processing section including:
   i. an amplifier, coupled to the Doppler circuit;
   ii. a low pass filter, coupled to the output of the amplifier, for filtering high frequency components and signals which represent objects moving rapidly relative to the vehicle upon which the system is mounted from the signal output by the amplifier:
   iii. signal processor, coupled to the low pass filter, for processing the output from the low pass filter to detect if an object is present in at least one blind spot region, and to detect if the object is within a predetermined range from the vehicle, but at least a predetermined minimum distance away;
d. an indicator circuit, coupled to the signal processor, for receiving the output of the signal processor and indicating to an operator of the vehicle on which the system is mounted, the presence of an object which has a relatively slow speed, as determined by the low pass filter, and which is at least a minimum distance as determined by the signal processor.

* * * * *